United States Patent
Yoshikawa et al.

(10) Patent No.: US 9,557,667 B2
(45) Date of Patent: Jan. 31, 2017

(54) METHOD FOR PRODUCING RESIN PARTICLE DISPERSION, AND METHOD FOR PRODUCING TONER FOR ELECTROSTATIC CHARGE IMAGE DEVELOPMENT USE

(71) Applicant: KAO CORPORATION, Chuo-ku (JP)

(72) Inventors: Takahiro Yoshikawa, Wakayama (JP); Shoichi Murata, Wakayama (JP)

(73) Assignee: KAO CORPORATION, Chuo-ku (JP)

(*) Notice: Subject to any disclaimer, the term of this patent is extended or adjusted under 35 U.S.C. 154(b) by 1 day.

(21) Appl. No.: 14/760,886

(22) PCT Filed: Jan. 14, 2014

(86) PCT No.: PCT/JP2014/050478
§ 371 (c)(1),
(2) Date: Jul. 14, 2015

(87) PCT Pub. No.: WO2014/112488
PCT Pub. Date: Jul. 24, 2014

(65) Prior Publication Data
US 2016/0026101 A1  Jan. 28, 2016

(30) Foreign Application Priority Data

Jan. 21, 2013 (JP) ................. 2013-008489

(51) Int. Cl.
| | | |
|---|---|---|
| *G03G 9/087* | (2006.01) | |
| *G03G 9/08* | (2006.01) | |
| *C08J 3/05* | (2006.01) | |
| *C08J 3/16* | (2006.01) | |

(52) U.S. Cl.
CPC ............. *G03G 9/0806* (2013.01); *C08J 3/05* (2013.01); *C08J 3/16* (2013.01); *G03G 9/087* (2013.01); *G03G 9/08755* (2013.01); *C08J 2367/02* (2013.01)

(58) Field of Classification Search
CPC .. G03G 9/0806; G03G 9/08755; G03G 9/087; C08J 3/16; C08J 3/05; C08J 2367/02
See application file for complete search history.

(56) References Cited

U.S. PATENT DOCUMENTS

| | | |
|---|---|---|
| 2008/0025754 A1 | 1/2008 | Ishiyama et al. |
| 2008/0236446 A1 | 10/2008 | Zhou et al. |
| 2008/0280218 A1 | 11/2008 | Sabu et al. |
| 2011/0065034 A1* | 3/2011 | Arima ................ G03G 9/08755 430/105 |
| 2013/0130166 A1* | 5/2013 | Matsuoka ............ G03G 9/0874 430/109.2 |
| 2013/0177846 A1 | 7/2013 | Watanabe et al. |

FOREIGN PATENT DOCUMENTS

| | | |
|---|---|---|
| CN | 1707365 A | 12/2005 |
| JP | 2002-258528 A | 9/2002 |
| JP | 2004-287149 A | 10/2004 |
| JP | 2005-29619 A | 2/2005 |
| JP | 2006-084843 A | 3/2006 |
| JP | 2008-20478 A | 1/2008 |
| JP | 2008-250320 A | 10/2008 |
| JP | 2008-281882 A | 11/2008 |
| JP | 2009-122674 A | 6/2009 |
| JP | 2011-186436 A | 9/2011 |
| JP | 2012-37702 A | 2/2012 |
| JP | 2014-66980 A | 4/2014 |
| WO | 2012/017635 A1 | 2/2012 |
| WO | WO 2012/046584 A1 | 4/2012 |

OTHER PUBLICATIONS

Combined Chinese Office Action and Search Report issued on Jul. 1, 2016 in Patent Application No. 201480005366.6 (with English language translation of categories of cited documents).
Extended European Search Report issued on Jul. 14, 2016 in Patent Application No. 14740657.3.
International Search Report issued Apr. 28, 2014 in PCT/JP2014/050478 filed Jan. 14, 2014.

* cited by examiner

*Primary Examiner* — Peter Vajda
(74) *Attorney, Agent, or Firm* — Oblon, McClelland, Maier & Neustadt, L.L.P.

(57) ABSTRACT

The present invention relates to a process for producing a resin particle dispersion, including a step (1) of mixing a polyester resin and a basic aqueous solution to obtain a resin neutralized product; and a step (2) of adding an aqueous medium to the resin neutralized product obtained in the step (1) to emulsify the resin neutralized product, in which a concentration of an ester group in the polyester resin is from 6.3 to 12 mmol/g, a pH of the basic aqueous solution as measured at 25° C. is from 8.5 to 13.5, and a content of an organic solvent in the resin neutralized product is not more than 10% by mass; and a process for producing a toner for development of electrostatic images, including steps of aggregating and coalescing the resin particles in the obtained resin particle dispersion. The present invention provides a process for producing a dispersion of resin particles having a small particle size and a narrow particle size distribution, and a process for producing a toner that has a narrow particle size distribution and is excellent in dot reproducibility and charge stability.

18 Claims, No Drawings

METHOD FOR PRODUCING RESIN PARTICLE DISPERSION, AND METHOD FOR PRODUCING TONER FOR ELECTROSTATIC CHARGE IMAGE DEVELOPMENT USE

FIELD OF THE INVENTION

The present invention relates to a process for producing a resin particle dispersion adopted for production of a toner for development of electrostatic images which is used in an electrostatic image development method, an electrostatic recording method, an electrostatic printing method or the like, and a process for producing a toner for development of electrostatic images using the resin particle dispersion.

BACKGROUND OF THE INVENTION

In the field of toners for electrophotography, with the progress of electrophotographic systems, it has been demanded to develop toners adaptable for high image quality and high copying or printing speed.

To meet a high image quality, there are known processes for producing toners having a narrow particle size distribution and a small particle size by an aggregating and coalescing method (emulsification-aggregation method or aggregation-coalescence method) in which fine resin particles, etc., are aggregated and coalesced together in an aqueous medium.

For example, Patent Literature 1 discloses a process for producing a developer which includes a step of adding an aggregating agent to a dispersion containing a binder resin and colorant-containing fine particles to aggregate the fine particles with the binder resin, and a step of coalescing the resulting aggregated particles together to form toner particles, for the purpose of attaining a high image quality and producing a developer having a good particle size distribution. In the production process, a pH value of the dispersion before adding the aggregating agent thereto, a pH value of the dispersion after adding the aggregating agent thereto and a pH value of the dispersion after coalescing the particles are controlled to satisfy a specific relationship with each other.

On the other hand, Patent Literature 2 discloses a process for producing a toner for development of electrostatic images in which an emulsion prepared by emulsifying a shell-forming resin in an aqueous medium containing 25 to 35% by mass of methyl ethyl ketone is added twice or more to a dispersion containing colored resin fine particles, and then an electrolyte aqueous solution is added to the resulting dispersion to form particles having a core/shell structure, for the purpose of producing a toner for development of electrostatic images which contains a less amount of coarse particles, is free from separation of the shell and aggregation of the toner during storage, and has such a core/shell structure as is capable of satisfying both a good low-temperature fusing property and a good heat-resistant storage stability.

Patent Literature 1: JP 2009-122674A
Patent Literature 2: JP 2008-20478A

SUMMARY OF THE INVENTION

That is, the present invention relates to the following process for producing a resin particle dispersion and the following process for producing a toner for development of electrostatic images.

<1> A process for producing a resin particle dispersion, including the steps (1) and (2):

Step (1): mixing a polyester resin and a basic aqueous solution to obtain a resin neutralized product; and Step (2): adding an aqueous medium to the resin neutralized product obtained in the step (1) to emulsify the resin neutralized product, a concentration of an ester group in the polyester resin being not less than 6.3 mmol/g and not more than 12 mmol/g, a pH of the basic aqueous solution as measured at 25° C. being not less than 8.5 and not more than 13.5, and a content of an organic solvent in the resin neutralized product being not more than 10% by mass.

<2> A process for producing a toner for development of electrostatic images, including the steps (1) to (4):

Step (1): mixing a polyester resin and a basic aqueous solution to obtain a resin neutralized product;

Step (2): adding an aqueous medium to the resin neutralized product obtained in the step (1) to emulsify the resin neutralized product, thereby obtaining a resin particle dispersion;

Step (3): aggregating the resin particles in the resin particle dispersion obtained in the step (2) to obtain aggregated particles; and Step (4): coalescing the aggregated particles obtained in the step (3) to obtain toner particles, a concentration of an ester group in the polyester resin being not less than 6.3 mmol/g and not more than 12 mmol/g, a pH of the basic aqueous solution as measured at 25° C. being not less than 8.5 and not more than 13.5, and a content of an organic solvent in the resin neutralized product being not more than 10% by mass.

DETAILED DESCRIPTION OF THE INVENTION

In the processes described in the above Patent Literatures, the toners obtained therein tend to be still insufficient in control of particle size distribution and therefore an image quality.

The present invention aims at providing a process for producing a dispersion of resin particles having a small particle size and a narrow particle size distribution, and further providing a process for producing a toner that has a narrow particle size distribution and is excellent in dot reproducibility and charge stability.

The present invention relates to the following process for producing a resin particle dispersion and the following process for producing a toner for development of electrostatic images.

<1> A process for producing a resin particle dispersion, including the steps (1) and (2):

Step (1): mixing a polyester resin and a basic aqueous solution to obtain a resin neutralized product; and Step (2): adding an aqueous medium to the resin neutralized product obtained in the step (1) to emulsify the resin neutralized product, a concentration of an ester group in the polyester resin being not less than 6.3 mmol/g and not more than 12 mmol/g, a pH of the basic aqueous solution as measured at 25° C. being not less than 8.5 and not more than 13.5, and a content of an organic solvent in the resin neutralized product being not more than 10% by mass.

<2> A process for producing a toner for development of electrostatic images, including the steps (1) to (4):

Step (1): mixing a polyester resin and a basic aqueous solution to obtain a resin neutralized product;

Step (2): adding an aqueous medium to the resin neutralized product obtained in the step (1) to obtain a resin particle dispersion;

Step (3): aggregating the resin particles in the resin particle dispersion obtained in the step (2) to obtain aggregated particles; and Step (4): coalescing the aggregated particles obtained in the step (3) to obtain toner particles, a concentration of an ester group in the polyester resin being not less than 6.3 mmol/g and not more than 12 mmol/g, a pH of the basic aqueous solution as measured at 25° C. being not less than 8.5 and not more than 13.5, and a content of an organic solvent in the resin neutralized product being not more than 10% by mass.

The resin particles contained in the resin particle dispersion obtained by the production process of the present invention has a small particle size and a narrow particle size distribution. As a result, the toner obtained by aggregating and coalescing the resin particles also has a narrow particle size distribution and is excellent in charge stability and dot reproducibility.

The process for producing a resin particle dispersion according to the present invention includes the steps (1) and (2), and is characterized in that a concentration of an ester group in the polyester resin used therein is not less than 6.3 mmol/g and not more than 12 mmol/g; a pH of the basic aqueous solution as measured at 25° C. is not less than 8.5 and not more than 13.5; and a content of an organic solvent in the resin neutralized product is not more than 10% by mass. In addition, in the process of the present invention, there is attained such an effect that the resin particles contained in the resin particle dispersion have a small particle size and a narrow particle size distribution. Furthermore, there is also attained such an effect that the toner obtained by aggregating and coalescing the resin particles has a narrow particle size distribution and is excellent in charge stability and dot reproducibility.

The reason why the resin particle dispersion and the toner for development of electrostatic images which are obtained by the production processes of the present invention can exhibit the above effects is considered as follows, though it is not clearly determined yet.

That is, when obtaining a stable resin particle dispersion by using the polyester resin, the acid component contained in the polyester resin is usually neutralized with a basic aqueous solution to emulsify the resin therein. However, in the conventional forced emulsification method using an emulsifier, since the base is too strongly penetrated into the resin, emulsification of the resin is readily attained, but an amount of a fine powder generated tend to be increased. In addition, when the base has an excessively strong basicity, a neutralization of the resin tends to proceed drastically. As a result, if the resin is hydrophobic, there tends to occur a difference in degree of neutralization between a surface and an inside of the resin, so that the resulting resin particles tend to suffer from variation in particle sizes thereof as well as formation of a fine powder therein. On the other hand, the polyester resin used in the present invention has a higher concentration of an ester group as a polar group and is more hydrophilic than the conventional polyester resins. Therefore, it is considered that the basic aqueous solution is more likely to be penetrated into the resin, so that the neutralization reaction is allowed to uniformly proceed not only on a surface of the resin but also inside thereof. In addition, it is considered that by controlling a pH of the basic aqueous solution to the specific range, it is possible to prevent the neutralization reaction from proceeding locally and allow the neutralization reaction to proceed uniformly without deterioration in reaction efficiency. As a result, it is considered that since the resulting resin neutralized product is a homogeneously neutralized product, the resin particles contained in the resin particle dispersion obtained by phase inversion of the resin neutralized product have a small particle size and a narrow particle size distribution.

The resin particles contained in the thus obtained resin particle dispersion has a uniform small particle size, and therefore are free of formation of coarse particles upon aggregation thereof, so that the resulting toner has a sharp particle size distribution. As a result, it is considered that the thus obtained toner exhibits a narrow charge distribution and a good dot reproducibility. In the following, the respective components and steps used in the present invention are explained.

[Process for Producing Resin Particle Dispersion]

The process for producing a resin particle dispersion according to the present invention includes the following steps (1) and (2).

Step (1): mixing a polyester resin and a basic aqueous solution to obtain a resin neutralized product; and Step (2): adding an aqueous medium to the resin neutralized product obtained in the step (1) to emulsify the resin neutralized product.

<Step (1)>

In the step (1), the polyester resin and the basic aqueous solution are mixed with each other to obtain the resin neutralized product.

In the step (1), the polyester resin and the basic aqueous solution are melted and mixed with each other to obtain the resin neutralized product. From the viewpoints of producing a toner having a sharp particle size distribution to improve a charge stability thereof and attaining a high-quality image, a colorant is preferably mixed in the resin neutralized product. In addition, from the viewpoint of improving a dispersion stability of the resin particles, a surfactant is preferably added to the mixture.

(Polyester Resin)

The concentration of an ester group in the polyester resin is not less than 6.3 mmol/g, preferably not less than 6.7 mmol/g, more preferably not less than 7.0 mmol/g, still more preferably not less than 7.5 mmol/g, even still more preferably not less than 9.0 mmol/g, further even still more preferably not less than 10.0 mmol/g, and further even still more preferably not less than 10.5 mmol/g, from the viewpoints of obtaining the dispersion of the resin particles having a small particle size and a narrow particle size distribution, and improving a dot reproducibility and a charge stability of the resulting toner. Also, from the viewpoint of improving a heat-resistant storage stability of the resulting toner, the concentration of an ester group in the polyester resin is not more than 12.0 mmol/g, preferably not more than 11.5 mmol/g, and more preferably not more than 11.0 mmol/g.

The concentration of an ester group in the polyester resin may be determined by the method described in Examples below.

The polyester resin preferably contains an acid group at a terminal end of a molecular chain thereof from the viewpoints of facilitating emulsification of the resin particle dispersion and enhancing a dispersion stability of the resin particle dispersion. Examples of the acid group include a carboxyl group, a sulfonic acid group, a phosphonic acid group and a sulfinic acid group. Among these acid groups, preferred is a carboxyl group, from the viewpoint of satisfying both of a good dispersion stability of the resin and a good heat-resistant storage stability of the resulting toner.

The content of the acid group-containing polyester resin in the resin particle dispersion is preferably not less than 80 parts by mass, more preferably not less than 90 parts by mass, still more preferably not less than 95 parts by mass, and even still more preferably substantially 100 parts by mass, on the basis of 100 parts by mass of the resin constituting the resin particles, from the viewpoints of facilitating emulsification of the resin particle dispersion, enhancing a dispersion stability of the resin particle dispersion, and improving a dot reproducibility and a charge stability of the resulting toner.

The raw material monomers for the acid group-containing polyester resin are not particularly limited, and as the raw material monomers, there may be used any alcohol component and any carboxylic acid component such as a carboxylic acid, a carboxylic acid anhydride and a carboxylic acid ester.

Specific examples of the preferred carboxylic acid component include aromatic dicarboxylic acids such as phthalic acid, isophthalic acid and terephthalic acid; aliphatic dicarboxylic acids such as fumaric acid, maleic acid, adipic acid, succinic acid, and succinic acids substituted with an alkyl group having not less than 1 and not more than 20 carbon atoms or an alkenyl group having not less than 2 and not more than 20 carbon atoms; trivalent or higher-valent polycarboxylic acids such as trimellitic acid and pyromellitic acid; and anhydrides and alkyl ($C_1$ to $C_3$) esters of these acids. These carboxylic acid components may be used alone or in combination of any two or more thereof. Of these carboxylic acid components, from the viewpoints of increasing a concentration of an ester group in the polyester resin, obtaining the resin particles having a small particle size and a sharp particle size distribution, and improving a dot reproducibility and a charge stability of the resulting toner, preferred are isophthalic acid, terephthalic acid, fumaric acid and succinic acid. In addition, the carboxylic acid component more preferably contains fumaric acid, and still more preferably contains combination of fumaric acid and terephthalic acid, combination of fumaric acid and isophthalic acid, or combination of fumaric acid and succinic acid.

Specific examples of the preferred alcohol component include aromatic diols such as alkylene ($C_2$ to $C_3$) oxide adducts (average molar number of addition: not less than 1 and not more than 16) of bisphenol A such as polyoxypropylene-2,2-bis(4-hydroxyphenyl)propane and polyoxyethylene-2,2-bis(4-hydroxyphenyl)propane; alicyclic diols such as hydrogenated products of bisphenol A; aliphatic diols such as ethylene glycol, 1,2-propanediol, neopentyl glycol, 1,4-butanediol, 1,3-butanediol, 2,3-butanediol, 1,6-hexanediol, and alkylene ($C_2$ to $C_4$) oxide adducts (average molar number of addition: not less than 1 and not more than 16) of these compounds; and aliphatic polyhydric alcohols such as glycerol, pentaerythritol, trimethylolpropane, sorbitol, and alkylene ($C_2$ to $C_4$) oxide adducts (average molar number of addition: not less than 1 and not more than 16) of these compounds. These alcohol components may be used alone or in combination of any two or more thereof.

Of these alcohol components, from the viewpoints of increasing a concentration of an ester group in the polyester resin, obtaining the resin particles having a small particle size and a sharp particle size distribution, and improving a dot reproducibility and a charge stability of the resulting toner, preferred are aliphatic diols having not less than 2 and not more than 4 main chain carbon atoms, such as ethylene glycol, 1,2-propanediol, neopentyl glycol, 1,4-butanediol, 1,3-butanediol and 2,3-butanediol, and more preferred is 1,2-propanediol. Meanwhile, the "number of main chain carbon atoms" in the aliphatic diol as used herein mean the number of carbon atoms which is obtained by subtracting the number of carbon atoms in a branched chain structure of the aliphatic diol from the total number of carbon atoms in the aliphatic diol.

Also, from the same viewpoints as described above, the content of these low-molecular weight aliphatic alcohols, preferably 1,2-propanediol, in the alcohol component is preferably not less than 70 mol %, more preferably not less than 80 mol %, and still more preferably substantially 100 mol %.

The polyester resin used in the present invention is preferably produced by polycondensing an alcohol component containing an aliphatic diol having not less than 2 and not more than 4 main chain carbon atoms and a carboxylic acid component containing fumaric acid, from the viewpoints of obtaining the resin particles having a small particle size and a sharp particle size distribution, and improving a dot reproducibility and a charge stability of the resulting toner, by increasing a concentration of an ester group in the polyester resin. Specific examples and suitable examples of the aliphatic diol having not less than 2 and not more than 4 main chain carbon atoms are the same as described above.

The equivalent ratio of the carboxylic acid component to the alcohol component (COOH group/OH group) in the polyester resin is preferably not less than 0.80, and more preferably not less than 0.85, and is also preferably not more than 1.10, and more preferably not more than 1.05, from the viewpoints of facilitating emulsification of the resin particle dispersion, enhancing a dispersion stability of the resin particle dispersion, and improving a dot reproducibility and a charge stability of the resulting toner.

The polycondensation reaction of the alcohol component and the carboxylic acid component may be carried out in an inert gas atmosphere at a temperature of not lower than about 180° C. and not higher than about 250° C., if required, in the presence of an esterification catalyst, an esterification co-catalyst, a polymerization inhibitor, etc., to produce the polyester resin. Examples of the esterification catalyst include tin compounds such as dibutyl tin oxide and tin di(2-ethyl hexanoate), and titanium compounds such as titanium diisopropylate bistriethanol aminate. Examples of the esterification co-catalyst include gallic acid, etc. The amount of the esterification catalyst used in the polycondensation reaction is preferably not less than 0.01 part by mass, and more preferably not less than 0.1 part by mass, and is also preferably not more than 1.0 part by mass, and more preferably not more than 0.8 part by mass, on the basis of 100 parts by mass of a total amount of the alcohol component and the carboxylic acid component. In addition, the amount of the esterification co-catalyst used in the polycondensation reaction is preferably not less than 0.001 part by mass, and more preferably not less than 0.01 part by mass, and is also preferably not more than 0.5 part by mass, and more preferably not more than 0.1 part by mass, on the basis of 100 parts by mass of a total amount of the alcohol component and the carboxylic acid component.

The softening point of the polyester resin is preferably not lower than 70° C., more preferably not lower than 80° C., and still more preferably not lower than 90° C., from the viewpoint of improving a heat-resistant storage stability of the resulting toner, and is also preferably not higher than 165° C., more preferably not higher than 130° C., and still more preferably not higher than 120° C., from the viewpoint of improving a low-temperature fusing property of the resulting toner.

The softening point of the polyester resin may be controlled by suitably adjusting the kind and compositional ratio of the alcohol component or carboxylic acid component therefor and an amount of the catalyst used, and adequately selecting reaction conditions such as a reaction temperature, a reaction period, and a reaction pressure.

The glass transition temperature of the polyester resin is preferably not lower than 20° C., more preferably not lower than 40° C., and still more preferably not lower than 45° C., from the viewpoint of improving a heat-resistant storage stability of the resulting toner, and is also preferably not higher than 80° C., more preferably not higher than 70° C., and still more preferably not higher than 65° C., from the viewpoint of improving a low-temperature fusing property of the resulting toner.

The glass transition temperature of the polyester resin may be controlled by suitably adjusting the kind and compositional ratio of the alcohol component or carboxylic acid component therefor, etc.

The acid value of the polyester resin is preferably not less than 5 mgKOH/g, more preferably not less than 10 mgKOH/g, and still more preferably not less than 15 mgKOH/g, from the viewpoint of improving a dispersion stability of the resin particle dispersion and a low-temperature fusing property of the resulting toner, and is also preferably not more than 40 mgKOH/g, more preferably not more than 30 mgKOH/g, and still more preferably not more than 25 mgKOH/g, from the viewpoint of improving a charge stability of the resulting toner.

The acid value or hydroxyl value of the polyester resin may be controlled by suitably adjusting the kind and compositional ratio of the alcohol component or carboxylic acid component therefor and an amount of the catalyst used, and adequately selecting reaction conditions such as a reaction temperature, a reaction period, and a reaction pressure.

(Basic Aqueous Solution)

In the present invention, the base for neutralizing the polyester resin is preferably used in the form of an aqueous solution thereof, from the viewpoints of obtaining the dispersion of the resin particles having a small particle size and a narrow particle size distribution and attaining a good handling property thereof.

The pH of the basic aqueous solution as measured at 25° C. is not less than 8.5, preferably not less than 9.0, more preferably not less than 10.0, still more preferably not less than 11.0, and even still more preferably not less than 12.0, from the viewpoints of obtaining the dispersion of the resin particles having a small particle size and a narrow particle size distribution and improving a dot reproducibility and a charge stability of the resulting toner, and is also not more than 13.5, preferably not more than 13.0, more preferably not more than 12.8, and still more preferably not more than 12.5, from the same viewpoint as described above.

The basic compound used in the basic aqueous solution may be either an inorganic base compound and an organic base compound.

Examples of the inorganic base compound include hydroxides, carbonates and hydrogen carbonates of alkali metals such as potassium, sodium and lithium; and ammonia. Specific examples of the hydroxides, carbonates and hydrogen carbonates of alkali metals include sodium hydroxide, potassium hydroxide, sodium carbonate, potassium carbonate, sodium hydrogen carbonate and potassium hydrogen carbonate. Examples of the organic base compound include alkanol amines such as diethyl ethanol amine.

Of these basic compounds, from the viewpoints of obtaining the dispersion of the resin particles having a small particle size and a narrow particle size distribution and improving a dot reproducibility and a charge stability of the resulting toner, preferred are potassium carbonate and sodium carbonate, and more preferred is potassium carbonate.

In addition, from the viewpoint of well controlling a pH of the basic aqueous solution without reducing a reaction efficiency of the neutralization, as the basic aqueous solution, there is preferably used a buffer solution obtained by mixing a strong base and a weak acid, more preferably a buffer solution obtained by mixing potassium hydroxide and phosphoric acid.

The concentration of the basic compound in the basic aqueous solution is preferably not less than 1% by mass, more preferably not less than 5% by mass, and still more preferably not less than 8% by mass, and is also preferably not more than 30% by mass, more preferably not more than 20% by mass, and still more preferably not more than 15% by mass, from the viewpoints of obtaining the dispersion of the resin particles having a small particle size and a narrow particle size distribution and enhancing a productivity of the resin particle dispersion.

The basic aqueous solution is mixed such that an acid group of the polyester resin is neutralized, and the resin particles are stably dispersed therein. The degree of neutralization of the resin particle dispersion obtained after mixing the basic aqueous solution therein is preferably not less than 50 mol %, more preferably not less than 70 mol %, still more preferably not less than 80 mol %, from the viewpoints of obtaining the dispersion of the resin particles having a small particle size and a narrow particle size distribution and improving a dot reproducibility and a charge stability of the resulting toner, and is also preferably not more than 200 mol %, more preferably not more than 180 mol %, and still more preferably not more than 160 mol %, from the viewpoint of suppressing hydrolysis of the polyester resin.

The degree of neutralization of the resin particle dispersion may be calculated by the method described in Examples below.

(Surfactant)

Examples of the surfactant include a nonionic surfactant, an anionic surfactant, a cationic surfactant and the like. Of these surfactants, preferred is a nonionic surfactant, from the viewpoint of improving a dispersion stability of the resin particles. The nonionic surfactant is more preferably used in combination with the anionic surfactant or the cationic surfactant, and still more preferably used in combination with the anionic surfactant.

When using the nonionic surfactant in combination with the anionic surfactant, the mass ratio of the nonionic surfactant to the anionic surfactant (nonionic surfactant/anionic surfactant) is preferably not less than 0.1, more preferably not less than 0.3, and still more preferably not less than 0.5, and is also preferably not more than 10, more preferably not more than 5, and still more preferably not more than 2, from the viewpoint of improving a dispersion stability of the resin particles.

Examples of the nonionic surfactant include polyoxyethylene alkyl ethers, polyoxyethylene alkyl aryl ethers, polyoxyethylene fatty acid esters and oxyethylene/oxypropylene block copolymers. Of these nonionic surfactants, polyoxyethylene alkyl ethers are preferred, from the viewpoint of improving a dispersion stability of the resin particles.

Specific examples of the polyoxyethylene alkyl ethers include polyoxyethylene oleyl ether and polyoxyethylene lauryl ether.

Specific examples of the polyoxyethylene alkyl aryl ethers include polyoxyethylene nonyl phenyl ether.

Specific examples of the polyoxyethylene fatty acid esters include polyethylene glycol monolaurate, polyethylene glycol monostearate and polyethylene glycol monooleate.

Examples of the anionic surfactant include alkylbenzenesulfonic acid salts, alkylsulfuric acid salts and alkylethersulfuric acid salts. Of these anionic surfactants, preferred are alkylbenzenesulfonic acid salts and alkylethersulfuric acid salts, from the viewpoint of improving a dispersion stability of the resin particles.

As the alkylbenzenesulfonic acid salts, preferred are alkali metal salts of dodecylbenzenesulfonic acid, and more preferred is sodium dodecylbenzenesulfonate. As the alkylsulfuric acid salts, preferred are alkali metal salts of dodecylsulfuric acid, and more preferred is sodium dodecylsulfate. As the alkylethersulfuric acid salts, preferred are alkali metal salts of dodecylethersulfuric acid, and more preferred is sodium dodecylethersulfate.

Specific examples of the cationic surfactant include alkylbenzenetrimethyl ammonium chlorides, alkyltrimethyl ammonium chlorides and dialkyldimethyl ammonium chlorides.

The amount of the surfactant added is preferably not less than 0.1 part by mass, more preferably not less than 0.5 part by mass, and still more preferably not less than 1 part by mass, and is also preferably not more than 15 parts by mass, more preferably not more than 10 parts by mass, and still more preferably not more than 5 parts by mass, on the basis of 100 parts by mass of the resin constituting the resin particles, from the viewpoint of improving a dispersion stability of the resin particles.

(Colorant)

The colorant may be used alone or in combination of any two or more kinds thereof.

Examples of the colorant used in the present invention include a pigment and a dye. Of these colorants, from the viewpoint of enhancing an optical density of printed images, the pigment is preferably used.

Examples of the pigment include a cyan pigment, a yellow pigment, a magenta pigment and a black pigment.

Preferred examples of the cyan pigment include a phthalocyanine pigment, and more preferred is copper phthalocyanine. Preferred examples of the yellow pigment include a monoazo pigment, an isoindoline pigment and a benzimidazolone pigment. Preferred examples of the magenta pigment include a quinacridone pigment, a soluble azo pigment such as a BONA lake pigment, and an insoluble azo pigment such as a naphthol AS pigment. Preferred examples of the black pigment include carbon blacks.

Examples of the dye include acridine dyes, azo dyes, benzoquinone dyes, azine dyes, anthraquinone dyes, indigo dyes, phthalocyanine dyes and Aniline Black dyes.

These colorants may be used alone or in combination of any two or more thereof.

The content of the colorant in the dispersion is preferably not less than 1 part by mass, more preferably not less than 2 parts by mass, and still more preferably not less than 3 parts by mass, on the basis of 100 parts by mass of the polyester resin, from the viewpoint of improving an optical density of toner images, and is also preferably not more than 20 parts by mass, more preferably not more than 15 parts by mass, and still more preferably not more than 10 parts by mass, on the basis of 100 parts by mass of the polyester resin, from the viewpoint of improving a low-temperature fusing property of the resulting toner.

(Organic Solvent)

The resin neutralized product may also contain an organic solvent unless the addition thereof adversely affects the effect of obtaining the dispersion of the resin particles having a small particle size and a narrow particle size distribution.

Examples of the organic solvent include aliphatic alcohols having not less than 1 and not more than 5 carbon atoms, such as methanol, ethanol and isopropanol; dialkyl ketones containing an alkyl group having not less than 1 and not more than 3 carbon atoms, such as acetone and methyl ethyl ketone; and cyclic ethers such as tetrahydrofuran.

The content of the organic solvent in the resin neutralized product is not more than 10% by mass, preferably not more than 5% by mass, more preferably not more than 1% by mass, still more preferably substantially 0% by mass, and even still more preferably 0% by mass. When the content of the organic solvent in the resin neutralized product is more than 10% by mass, the resin tends to be swelled up with the organic solvent, so that the alkali tends to hardly act on an inside of the resin, and the resin tends to be inhibited from undergoing homogeneous neutralization.

(Mixing Method)

As the method for obtaining the resin neutralized product, there is preferably used a method in which the polyester resin, the basic aqueous solution and optional components such as a colorant, preferably a surfactant, are charged into a vessel, and while stirring the contents of the vessel using a stirrer, the resin is melted and uniformly mixed therein.

The temperature upon melting and mixing the resin is preferably not lower than a glass transition temperature of the polyester resin, and not higher than a boiling point of an aqueous medium used in the following step (2), from the viewpoints of obtaining the dispersion of the resin particles having a small particle size and a narrow particle size distribution and improving a dot reproducibility and a charge stability of the resulting toner. More specifically, the temperature upon melting and mixing the resin is preferably not lower than 70° C., more preferably not lower than 80° C., and still more preferably not lower than 90° C., and is also preferably lower than 100° C., and more preferably not higher than 98° C.

<Step (2)>

In the step (2), an aqueous medium is added to the resin neutralized product obtained in the step (1) to emulsify the resin neutralized product, thereby obtaining a resin particle dispersion.

As the method of obtaining the resin particle dispersion by emulsifying the resin neutralized product, there may be used a method of adding the resin and the like to the aqueous medium and subjecting the resulting mixture to dispersing treatment using a disperser, a method of gradually adding the aqueous medium to the resin and the like to subject the resulting mixture to phase inversion emulsification, etc. Of these methods, from the viewpoints of obtaining the dispersion of the resin particles having a small particle size and a narrow particle size distribution and improving a dot reproducibility and a charge stability of the resulting toner, the method using phase inversion emulsification is preferred.

When adopting the method using phase inversion emulsification, it is considered that the dispersion of the resin particles having a small particle size and a narrow particle size distribution can be more readily produced without deterioration in effect of obtaining the resin neutralized product more uniformly neutralized by adjusting a pH of the basic aqueous solution to the specific range in the step (1).

(Aqueous Medium)

The aqueous medium preferably contains water as a main component. From the viewpoints of obtaining the dispersion of the resin particles having a small particle size and a narrow particle size distribution and improving a dot reproducibility and a charge stability of the resulting toner, the content of water in the aqueous medium is preferably not less than 80% by mass, more preferably not less than 90% by mass, still more preferably not less than 95% by mass, even still more preferably substantially 100% by mass, and further even even still more preferably 100% by mass. As the water, deionized water or distilled water is preferably used.

Examples of components other than water which may be contained in the aqueous medium include water-soluble organic solvents, e.g., aliphatic alcohols having not less than 1 and not more than 5 carbon atoms, such as methanol, ethanol and isopropanol; dialkyl ketones containing an alkyl group having not less than 1 and not more than 3 carbon atoms, such as acetone and methyl ethyl ketone; and cyclic ethers such as tetrahydrofuran.

The temperature upon adding the aqueous medium is preferably not lower than a glass transition temperature of the polyester resin, and is also preferably not higher than a boiling point of the aqueous medium used in the step (2), from the viewpoints of obtaining the dispersion of the resin particles having a small particle size and a narrow particle size distribution and improving a dot reproducibility and a charge stability of the resulting toner. More specifically, the temperature upon adding the aqueous medium is preferably not lower than 70° C., more preferably not lower than 80° C., and still more preferably not lower than 90° C., and is also preferably lower than 100° C., and more preferably not higher than 98° C.

From the viewpoints of obtaining the dispersion of the resin particles having a small particle size and a narrow particle size distribution and improving a dot reproducibility and a charge stability of the resulting toner, the velocity of addition of the aqueous medium until terminating the phase inversion is preferably not less than 0.1 part by mass/min, more preferably not less than 1 part by mass/min, and still more preferably not less than 3 parts by mass/min, and is also preferably not more than 50 parts by mass/min, more preferably not more than 30 parts by mass/min, still more preferably not more than 15 parts by mass/min, and even still more preferably not more than 8 parts by mass/min, on the basis of 100 parts by mass of the resin constituting the resin particles. After terminating the phase inversion, the velocity of addition of the aqueous medium is not particularly limited.

The amount of the aqueous medium used is preferably not less than 50 parts by mass, more preferably not less than 100 parts by mass, and still more preferably not less than 150 parts by mass, and is also preferably not more than 2,000 parts by mass, more preferably not more than 1,000 parts by mass, and still more preferably not more than 500 parts by mass, on the basis of 100 parts by mass of the resin constituting the resin particles, from the viewpoints of enhancing a productivity of the toner and obtaining aggregated particles having a sharp particle size distribution in the subsequent aggregating step.

The solid content of the resin particle dispersion is preferably not less than 7% by mass, more preferably not less than 10% by mass, still more preferably not less than 20% by mass, and even still more preferably not less than 25% by mass, and is also preferably not more than 50% by mass, more preferably not more than 40% by mass, and still more preferably not more than 35% by mass, from the viewpoints of enhancing a productivity of the toner and improving a dispersion stability of the resin particles. Meanwhile, the solid content means a total content of non-volatile components including the resins, surfactants and the like.

The volume median particle size of the resin particles contained in the resin particle dispersion is preferably not less than 20 nm, more preferably not less than 50 nm, and still more preferably not less than 100 nm, and is also preferably not more than 500 nm, more preferably not more than 400 nm, and still more preferably not more than 300 nm, from the viewpoints of obtaining a toner having a sharp particle size distribution and improving a dot reproducibility and a charge stability of the resulting toner. Meanwhile, the volume median particle size as used herein means a particle size at which a cumulative volume frequency calculated on the basis of a volume fraction of the particles from a smaller particle size side thereof is 50%, and may be determined by the method described in Examples below.

The coefficient of variation of particle size distribution (CV: %) of the resin particles is preferably not more than 30%, more preferably not more than 26%, still more preferably not more than 24%, even still more preferably not more than 22%, and further even still more preferably not more than 20%, from the viewpoints of producing a toner having a sharp particle size distribution and improving a dot reproducibility and a charge stability of the resulting toner. Meanwhile, the CV as used herein means the value represented by the following formula, and may be determined by the method described in Examples below.

$$CV\ (\%) = [\text{Standard Deviation of Particle Size Distribution } (\mu m)/\text{Volume-Average Particle Size } (\mu m)] \times 100.$$

[Process for Producing Toner]

The process for producing a toner according to the present invention further includes the following steps (3) and (4), in addition to the aforementioned steps (1) and (2).

Step (3): aggregating the resin particles in the resin particle dispersion obtained in the step (2) to obtain aggregated particles; and Step (4): coalescing the aggregated particles obtained in the step (3) to obtain toner particles.

<Step (3)>

In the step (3), the resin particles in the resin particle dispersion obtained in the step (2) are aggregated to obtain aggregated particles.

Upon subjecting the resin particle dispersion to the aggregating step, the resin particles may be aggregated together with releasing agent particles containing a releasing agent, charge controlling agent particles containing a charge controlling agent, colorant particles containing a colorant, and the like.

As described above, the colorant is preferably incorporated into the resin particles, from the viewpoints of producing a toner having a sharp particle size distribution, improving a charge stability of the resulting toner and attaining a high-quality image.

Also, from the viewpoint of improving a low-temperature fusing property and an anti-hot offset property of the resulting toner, the releasing agent particles are preferably aggregated together with the resin particles.

(Releasing Agent Particles)

Upon producing the releasing agent particles, a surfactant is preferably incorporated thereinto from the viewpoint of suppressing aggregation of the releasing agent particles. When incorporating the surfactant into the releasing agent particles, the content of the surfactant in the releasing agent particles is preferably not less than 0.01 part by mass, more preferably not less than 0.1 part by mass, and still more preferably not less than 0.5 part by mass, on the basis of 100 parts by mass of the releasing agent, from the viewpoint of suppressing aggregation of the releasing agent particles, and is also preferably not more than 10 parts by mass, more preferably not more than 5 parts by mass, and still more preferably not more than 2 parts by mass, on the basis of 100 parts by mass of the releasing agent, from the viewpoint of improving a charging property of the resulting toner.

The volume-median particle size of the releasing agent particles is preferably not less than 0.1 μm, and more preferably not less than 0.2 μm, and is also preferably not more than 1 μm, more preferably not more than 0.7 μm, and still more preferably not more than 0.5 μm, from the viewpoint of improving a charge stability and an anti-hot offset property of the resulting toner.

The CV of the releasing agent particles is preferably not more than 50%, more preferably not more than 40%, and still more preferably not more than 35%, from the viewpoint of improving a charge stability of the resulting toner, and is also preferably not less than 15%, more preferably not less than 20%, and still more preferably not less than 25%, from the viewpoint of enhancing a productivity of the toner.

(Releasing Agent)

Examples of the releasing agent include low-molecular weight polyolefins such as polyethylene, polypropylene and polybutene; silicone waxes; fatty acid amides such as oleamide and stearamide; vegetable waxes; animal waxes such as beeswax; mineral and petroleum waxes; and synthetic waxes such as ester waxes.

Specific examples of the vegetable waxes include carnauba wax, rice wax and candelilla wax. Of these vegetable waxes, carnauba wax is preferred from the viewpoint of improving a low-temperature fusing property of the resulting toner.

Specific examples of the mineral and petroleum waxes include a montan wax, a paraffin wax and a Fischer-Tropsch wax. Of these mineral and petroleum waxes, a paraffin wax is preferred from the viewpoint of improving a low-temperature fusing property of the resulting toner.

These releasing agents may be used alone or in combination of any two or more thereof, and are preferably used in combination of any two or more thereof.

The melting point of the releasing agent is preferably not lower than 60° C., more preferably not lower than 70° C., and still more preferably not lower than 80° C., from the viewpoint of improving a heat-resistant storage stability of the resulting toner, and is also preferably not higher than 100° C., more preferably not higher than 95° C., and still more preferably not higher than 90° C., from the viewpoint of improving a low-temperature fusing property of the resulting toner. When using two or more kinds of releasing agents in combination with each other, the melting points of these releasing agents all are in the range of not lower than 60° C. and not higher than 90° C., from the viewpoint of improving a low-temperature fusing property of the resulting toner.

In the present invention, the melting point of the releasing agent may be determined by the method described in Examples below. When using two or more kinds of releasing agents in combination with each other, the melting point of the releasing agent as defined in the present invention means a melting point of the releasing agent having a largest mass ratio among the releasing agents contained in the resulting toner. Meanwhile, if all of the releasing agents have the same mass ratios, the lowest melting point among those of the releasing agents is regarded as the melting point of the releasing agent as defined in the present invention.

The amount of the releasing agent used is preferably not less than 1 part by mass, more preferably not less than 2 parts by mass, and still more preferably not less than 5 parts by mass, on the basis of 100 parts by mass of the resin contained in the toner, from the viewpoint of improving a releasing property and a low-temperature fusing property of the resulting toner, and is also preferably not more than 20 parts by mass, and more preferably not more than 15 parts by mass, on the basis of 100 parts by mass of the resin contained in the toner, from the viewpoint of improving a heat-resistant storage stability of the resulting toner.

(Surfactant)

The surfactant used in the releasing agent particles is preferably an anionic surfactant, more preferably a carboxylic acid salt, and still more preferably an alkenyl succinic acid salt, from the viewpoints of improving a dispersion stability of the releasing agent and enhancing an aggregating property of the releasing agent particles with the resin particles.

The amount of the surfactant used is preferably not less than 0.05 part by mass, more preferably not less than 0.1 part by mass, and still more preferably not less than 0.5 part by mass, on the basis of 100 parts by mass of the releasing agent, from the viewpoint of improving a dispersion stability of the releasing agent, and is also preferably not more than 10 parts by mass, more preferably not more than 5 parts by mass, and still more preferably not more than 2 parts by mass, on the basis of 100 parts by mass of the releasing agent, from the viewpoint of enhancing an aggregating property of the releasing agent particles with the resin particles.

(Production of Releasing Agent Particles)

The releasing agent particles are preferably obtained in the form of a releasing agent particle dispersion that is prepared by dispersing the releasing agent in an aqueous medium.

The releasing agent particle dispersion is preferably obtained by dispersing the releasing agent and the aqueous medium in the presence of the surfactant at a temperature not lower than a melting point of the releasing agent by using a disperser. Examples of the disperser used include a homogenizer and an ultrasonic disperser.

The preferred forms of the aqueous medium used for production of the releasing agent particles are the same as those used for production of the resin particle dispersion.

The solid content of the releasing agent particle dispersion is preferably not less than 5% by mass, more preferably not less than 10% by mass, and still more preferably not less than 15% by mass, and is also preferably not more than 40% by mass, more preferably not more than 30% by mass, and still more preferably not more than 25% by mass, from the viewpoints of enhancing a productivity of the toner and improving a dispersion stability of the resin particle dispersion. Meanwhile, the solid content means a total content of non-volatile components including the releasing agents, surfactants and the like.

In the step (3), first, the resin particles and the releasing agent particles are mixed with each other in the aqueous medium to obtain a mixed dispersion.

The order of mixing of the respective components is not particularly limited, and these components may be added in any order or may be added at the same time.

The content of the resin particles in the mixed dispersion is preferably not less than 10% by mass, and more preferably not less than 20% by mass, from the viewpoint of enhancing a productivity of the toner, and is also preferably not more than 40% by mass, and more preferably not more than 30% by mass, from the viewpoint of well controlling aggregation of the particles to obtain aggregated particles having a desired particle size.

The content of the aqueous medium in the mixed dispersion is preferably not less than 60% by mass, and more preferably not less than 70% by mass, from the viewpoint of well controlling aggregation of the particles to obtain aggregated particles having a desired particle size, and is also preferably not more than 90% by mass, and more preferably not more than 80% by mass, from the viewpoint of enhancing a productivity of the toner.

The content of the releasing agent particles in mixed dispersion is preferably not less than 1 part by mass, more preferably not less than 2 parts by mass, and still more preferably not less than 5 parts by mass, on the basis of 100 parts by mass of the resin particles, from the viewpoints of improving a releasing property and a low-temperature fusing property of the resulting toner, and is also preferably not more than 20 parts by mass, and more preferably not more than 15 parts by mass, on the basis of 100 parts by mass of the resin particles, from the viewpoint of improving a heat-resistant storage stability of the resulting toner.

The temperature upon the mixing is preferably not lower than 0° C. and not higher than 40° C., from the viewpoint of well controlling aggregation of the particles to obtain aggregated particles having a desired particle size.

Next, the particles in the mixed dispersion are aggregated together to obtain a dispersion of the aggregated particles. In this case, an aggregating agent is preferably added to the mixed dispersion, from the viewpoint of conducting aggregation of the particles in an efficient manner.

The aggregating agent used in the present invention is preferably an electrolyte, and more preferably a salt, from the viewpoint of obtaining a toner having a desired particle size while preventing excessive aggregation thereof.

Examples of the aggregating agent used in the present invention include organic aggregating agents such as a cationic surfactant in the form of a quaternary salt and polyethyleneimine; and inorganic aggregating agents such as an inorganic metal salt, an inorganic ammonium salt and a divalent or higher-valent metal complex. Of these aggregating agents, from the viewpoint of improving a charge stability of the resulting toner, preferred are inorganic aggregating agents, more preferred are an inorganic metal salt and an inorganic ammonium salt, and still more preferred is an inorganic ammonium salt.

The valence of the cation in the inorganic aggregating agents is preferably a monovalence or more and a pentavalence or lower, more preferably a monovalence or more and a divalence or lower, and still more preferably a monovalence, from the viewpoint of obtaining a toner having a desired particle size while preventing excessive aggregation thereof.

Examples of the monovalent cation in the inorganic aggregating agents include sodium, potassium and ammonium. Of these monovalent cations, preferred is ammonium, from the viewpoint of improving a charge stability of the resulting toner.

Specific examples of the inorganic metal salt include metal salts such as sodium sulfate, sodium nitrate, sodium chloride, calcium chloride and calcium nitrate; and inorganic metal salt polymers such as poly(aluminum chloride) and poly(aluminum hydroxide).

Specific examples of the inorganic ammonium salt include ammonium sulfate, ammonium chloride and ammonium nitrate.

Among these aggregating agents, preferred is ammonium sulfate.

The amount of the aggregating agent used is preferably not more than 50 part by mass, more preferably not more than 40 part by mass, and still more preferably not more than 30 part by mass, on the basis of 100 parts by mass of the resin constituting the resin particles, from the viewpoint of improving a charge stability of the resulting toner, and is also preferably not less than 1 parts by mass, more preferably not less than 5 parts by mass, and still more preferably not less than 10 parts by mass, on the basis of 100 parts by mass of the resin constituting the resin particles, from the viewpoint of well controlling aggregation of the resin particles to obtain aggregated particles having a desired particle size.

The aggregating agent is preferably added dropwise into the mixed dispersion. In this case, the aggregating agent may be added at one time, or intermittently or continuously. Upon and after adding the aggregating agent, the obtained dispersion is preferably fully stirred, from the viewpoint of well controlling aggregation of the resin particles to obtain aggregated particles having a desired particle size.

The aggregating agent to be added dropwise is preferably in the form of an aqueous solution, from the viewpoint of well controlling aggregation of the resin particles to obtain aggregated particles having a desired particle size. The concentration of the aqueous solution of the aggregating agent is preferably not less than 3% by mass, more preferably not less than 5% by mass, and still more preferably not less than 7% by mass, and is also preferably not more than 30% by mass, more preferably not more than 20% by mass, and still more preferably not more than 15% by mass, from the viewpoint of well controlling aggregation of the resin particles to obtain aggregated particles having a desired particle size.

As the aggregating method, there may be mentioned a method in which the aggregating agent, preferably in the form of an aqueous solution thereof, is added dropwise into a vessel filled with the mixed dispersion. In this case, the aggregating agent may be added at one time, or intermittently or continuously. Upon and after adding the aggregating agent, the obtained dispersion is preferably fully stirred.

The dropwise addition time of the aggregating agent is preferably not less than 1 min, more preferably not less than 2 min, and still more preferably not less than 3 min, from the viewpoint of well controlling aggregation of the particles to obtain aggregated particles having a desired particle size, and is also preferably not more than 120 min, more preferably not more than 60 min, still more preferably not more than 30 min, and even still more preferably not more than 10 min, from the viewpoint of enhancing a productivity of the toner.

The temperature upon the dropwise addition of the aggregating agent is preferably not lower than 0° C., and more preferably not lower than 10° C., from the viewpoint of enhancing a productivity of the toner, and is also preferably not higher than 50° C., more preferably not higher than 40° C., and still more preferably not higher than 30° C., from the viewpoint of well controlling aggregation of the particles to obtain aggregated particles having a desired particle size.

Furthermore, from the viewpoints of promoting aggregation of the particles and obtaining aggregated particles having desired particle size and particle size distribution, the temperature of the dispersion obtained after adding the aggregating agent to the mixed dispersion is preferably raised. The temperature of the dispersion to be maintained is preferably not lower than 50° C. and not higher than 70° C.

At the time at which a whole amount of the resin particles are added and growth of a toner having an appropriate particle size is achieved, the aggregating step is stopped. With respect to the particle size of the aggregated particles at which the aggregating step is to be stopped, from the viewpoints of improving a charge stability of the toner and attaining a high-quality image, the volume median particle size of the aggregated particles is preferably not less than 2 μm, more preferably not less than 3 μm, and still more preferably not less than 4 μm, and is also preferably not more than 10 μm, more preferably not more than 8 μm, and still more preferably not more than 6 μm.

As the method of stopping the aggregating step, there may be used a method of cooling the dispersion, a method of adding an aggregation stopping agent to the dispersion, a method of diluting the dispersion, etc. Of these methods, from the viewpoint of surely preventing occurrence of unnecessary aggregation of the particles, preferred is the method of adding an aggregation stopping agent to the dispersion to stop the aggregating step.

As the aggregation stopping agent, a surfactant is preferably used. The aggregation stopping agent is more preferably an anionic surfactant. Examples of the anionic surfactants include alkylethersulfuric acid salts, alkylsulfuric acid salts and straight-chain alkylbenzenesulfonic acid salts. These aggregation stopping agents may be used alone or in combination of any two or more thereof.

The amount of the aggregation stopping agent added is preferably not less than 0.1 part by mass, more preferably not less than 1 part by mass, and still more preferably not less than 2 parts by mass, on the basis of 100 parts by mass of the resin, from the viewpoint of surely preventing occurrence of unnecessary aggregation of the particles, and is also preferably not more than 15 parts by mass, more preferably not more than 10 parts by mass, and still more preferably not more than 6 parts by mass, on the basis of 100 parts by mass of the resin, from the viewpoint of reducing an amount of the aggregation stopping agent remaining in the toner and improving a charge stability of the resulting toner. The aggregation stopping agent is preferably added in the form of an aqueous solution thereof, from the viewpoint of enhancing a productivity of the toner.

The temperature upon adding the aggregation stopping agent to the dispersion is preferably the same as the temperature at which the dispersion of the aggregated particles is to be maintained, more specifically, not lower than 50° C. and not higher than 70° C., from the viewpoint of enhancing a productivity of the toner.

From the viewpoints of improving a charge stability of the toner and attaining a high-quality image, the volume median particle size of the resulting aggregated particles is preferably not less than 1 more preferably not less than 2 μm, and still more preferably not less than 3 μm, and is also preferably not more than 10 μm, more preferably not more than 8 μm, and still more preferably not more than 6 μm.

Also, from the viewpoints of producing a toner having a sharp particle size distribution, improving a charge stability of the resulting toner and attaining a high-quality image, the CV of the resulting aggregated particles is preferably not more than 30%, more preferably not more than 28%, and still more preferably not more than 25%.

The thus obtained aggregated particles may be further aggregated with other resin particles to obtain aggregated particles having a core/shell structure. When producing the aggregated particles having a core/shell structure, it is preferred that the resin particles as a core of the toner contains a crystalline polyester.

<Step (4)>

In the step (4), the aggregated particles obtained in the step (3) are coalesced to obtain toner particles.

The respective particles contained in the aggregated particles which are adhered to each other mainly only by a physical force are integrally coalesced together in this step to thereby form toner particles.

From the viewpoints of promoting coalescence of the aggregated particles and enhancing a productivity of the toner, the temperature at which the reaction system in the step (4) is to be maintained is preferably not lower than a temperature lower by 10° C. than a glass transition temperature of the resin, more preferably not lower than the glass transition temperature, and still more preferably not lower than a temperature higher by 5° C. than the glass transition temperature. Also, from the viewpoint of controlling a shape of the toner, the temperature at which the reaction system in the step (4) is to be maintained is preferably not higher than a temperature higher by 40° C. than the glass transition temperature of the resin, more preferably not higher than a temperature higher by 35° C. than the glass transition temperature, and still more preferably not higher than a temperature higher by 30° C. than the glass transition temperature.

In addition, from the viewpoint of improving a low-temperature fusing property of the resulting toner, the temperature at which the reaction system in the step (4) is to be maintained is preferably not higher than a melting point of the releasing agent, more preferably not higher than a temperature lower by 3° C. than the melting point of the releasing agent, and still more preferably not higher than a temperature lower by 5° C. than the melting point of the releasing agent.

The time period to be maintained at the aforementioned temperature in the step (4) is preferably not less than 3 min, more preferably not less than 5 min, and still preferably not less than 8 min, from the viewpoint of ensuring coalescence of the aggregated particles, and is also preferably not more than 10 h, more preferably not more than 5 h, still more preferably not more than 1 h, and even still more preferably not more than 30 min, from the viewpoint of enhancing a productivity of the toner.

From the viewpoints of improving a charge stability of the resulting toner and attaining a high-quality image, the volume median particle size of the toner particles obtained in the step (4) is preferably not less than 2 μm, more preferably not less than 3 μm, and still more preferably not less than 4 μm, and is also preferably not more than 10 μm, more preferably not more than 8 μm, and still more preferably not more than 6 μm.

Meanwhile, the average particle size of the toner particles obtained in the step (4) is preferably not more than an average particle size of the aggregated particles. That is, in the step (4), the aggregated particles are preferably free from aggregation and coalescence therebetween.

(Additional Treatment Step)

In the present invention, after completion of the step (4), the obtained dispersion may be subjected to an additional treatment step. In the additional treatment step, the toner particles are preferably isolated from the dispersion.

The toner particles obtained in the step (4) are present in the aqueous medium. Therefore, the dispersion is preferably first subjected to solid-liquid separation. The solid-liquid separation procedure is preferably conducted by a suction filtration method, etc.

The particles obtained by the solid-liquid separation are preferably then washed. In this case, when using the nonionic surfactant upon producing the resin particles, it is preferred that the nonionic surfactant added is also removed by washing. Therefore, the resulting particles are preferably washed with an aqueous solution at a temperature not higher than a cloud point of the nonionic surfactant. The washing treatment is preferably carried out plural times.

Next, the obtained toner particles are preferably dried. The temperature upon drying the toner particles is preferably controlled such that the temperature of the toner particles themselves is preferably lower by 5° C. or more, than a glass transition temperature of the polyester, and more preferably lower by 10° C. or more, than the glass transition temperature. As the drying method, there are preferably used a vibration-type fluidization drying method, a spray-drying method, a freeze-drying method and a flash jet method, etc. The content of water in the toner particles obtained after drying is preferably adjusted to not more than 1.5% by mass, and more preferably not more than 1.0% by mass, from the viewpoint of improving a charge stability of the resulting toner.

(Toner for Development of Electrostatic Images)

The toner particles obtained by the drying, etc., may be directly used as the toner according to the present invention. However, it is preferred that the toner particles are subjected to the below-mentioned surface treatment, and the thus surface-treated toner particles are used as the toner for development of electrostatic images.

The volume median particle size of the toner is preferably not less than 2 μm, more preferably not less than 3 μm, and still more preferably not less than 4 μm, and is also preferably not more than 10 μm, more preferably not more than 8 μm, and still more preferably not more than 6 μm, from the viewpoints of improving a charge stability of the resulting toner and attaining a high-quality image.

The CV of the toner is preferably not more than 30%, more preferably not more than 27%, still more preferably not more than 25%, and even still more preferably not more than 23%, from the viewpoints of producing a toner having a sharp particle size distribution, improving a charge stability of the resulting toner and attaining a high-quality image, and is also preferably not less than 15%, and more preferably not less than 18%, from the viewpoint of enhancing a productivity of the toner.

(External Additives)

The thus obtained toner particles may be directly used as the toner for development of electrostatic images according to the present invention. However, the toner particles are preferably subjected to surface treatment in which an external additive such as a fluidizing agent is applied onto a surface of the respective toner particles, and the resulting surface-treated toner particles may be used as the toner.

Examples of the external additive include inorganic fine particles such as hydrophobic silica fine particles, titanium oxide fine particles, alumina fine particles, cerium oxide fine particles and carbon blacks; and polymer fine particles such as fine particles of polycarbonates, polymethyl methacrylate, silicone resins, etc. Among these fine particles, preferred are hydrophobic silica fine particles.

When subjecting the toner particles to the surface treatment with the external additive, the amount of the external additive added to the toner is preferably not less than 1 part by mass, and more preferably not less than 2 parts by mass, and is also preferably not more than 5 parts by mass, and more preferably not more than 4 parts by mass, on the basis of 100 parts by mass of the toner particles.

The toner for development of electrostatic images which is obtained according to the present invention can be used as one-component system developer, or can be mixed with a carrier to form a two-component system developer.

With respect to the aforementioned embodiments of the present invention, there are further disclosed the following aspects concerning the process for producing a resin particle dispersion, and the process for producing a toner for development of electrostatic images.

<1> A process for producing a resin particle dispersion, including the following steps (1) and (2);

Step (1); mixing a polyester resin and a basic aqueous solution to obtain a resin neutralized product; and Step (2): adding an aqueous medium to the resin neutralized product obtained in the step (1) to emulsify the resin neutralized product, a concentration of an ester group in the polyester resin being not less than 6.3 mmol/g and not more than 12 mmol/g, a pH of the basic aqueous solution as measured at 25° C. being not less than 8.5 and not more than 13.5, and a content of an organic solvent in the resin neutralized product being not more than 10% by mass.

<2> The process for producing a resin particle dispersion according to the above aspect <1>, wherein the concentration of an ester group in the polyester resin is preferably not less than 6.7 mmol/g, more preferably not less than 7.0 mmol/g, still more preferably not less than 7.5 mmol/g, even still more preferably not less than 9.0 mmol/g, further even still more preferably not less than 10.0 mmol/g, and further even still more preferably not less than 10.5 mmol/g, and is also preferably not more than 11.5 mmol/g, and more preferably not more than 11.0 mmol/g.

<3> The process for producing a resin particle dispersion according to the above aspect <1> or <2>, wherein the polyester resin is produced by polycondensing an alcohol component containing an aliphatic diol having not less than 2 and not more than 4 main chain carbon atoms and a carboxylic acid component containing fumaric acid.

<4> The process for producing a resin particle dispersion according to the above aspect <3>, wherein the alcohol component containing an aliphatic diol having not less than 2 and not more than 4 main chain carbon atoms is preferably at least one compound selected from the group consisting of ethylene glycol, 1,2-propanediol, neopentyl glycol, 1,4-butanediol, 1,3-butanediol and 2,3-butanediol, and more preferably 1,2-propanediol.

<5> The process for producing a resin particle dispersion according to the above aspect <3> or <4>, wherein the carboxylic acid component containing fumaric acid is combination of fumaric acid and terephthalic acid, combination of fumaric acid and isophthalic acid, or combination of fumaric acid and succinic acid.

<6> The process for producing a resin particle dispersion according to any one of the above aspects <1> to <5>, wherein the pH of the basic aqueous solution as measured at 25° C. is preferably not less than 9.0, more preferably not less than 10.0, still more preferably not less than 11.0, and even still more preferably not less than 12.0, and is also preferably not more than 13.0, more preferably not more than 12.8, and still more preferably not more than 12.5.

<7> The process for producing a resin particle dispersion according to any one of the above aspects <1> to <6>, wherein a basic compound used in the basic aqueous solution is an inorganic base compound, preferably sodium carbonate or potassium carbonate, and more preferably potassium carbonate.

<8> The process for producing a resin particle dispersion according to any one of the above aspects <1> to <7>, wherein the basic aqueous solution is a buffer solution obtained by mixing a strong base and a weak acid, and preferably a buffer solution obtained by mixing potassium hydroxide and phosphoric acid.

<9> The process for producing a resin particle dispersion according to any one of the above aspects <1> to <8>, wherein a degree of neutralization of the resin particle dispersion after mixing the basic aqueous solution therein is preferably not less than 50 mol %, more preferably not less than 70 mol %, and still more preferably not less than 80 mol %, and is also preferably not more than 200 mol %, more preferably not more than 180 mol %, and still more preferably not more than 160 mol %.

<10> The process for producing a resin particle dispersion according to any one of the above aspects <1> to <9>, wherein a surfactant is added in the step (1).

<11> The process for producing a resin particle dispersion according to the above aspect <10>, wherein the surfactant contains a nonionic surfactant, preferably combination of a nonionic surfactant with an anionic surfactant or a cationic surfactant, and more preferably combination of a nonionic surfactant with an anionic surfactant.

<12> The process for producing a resin particle dispersion according to the above aspect <10> or <11>, wherein a mass ratio of the nonionic surfactant to the anionic surfactant (nonionic surfactant/anionic surfactant) is preferably not less than 0.1, more preferably not less than 0.3, and still more preferably not less than 0.5, and is also preferably not more than 10, more preferably not more than 5, and still more preferably not more than 2.

<13> The process for producing a resin particle dispersion according to any one of the above aspects <10> to <12>, wherein an amount of the surfactant added is preferably not less than 0.1 part by mass, more preferably not less than 0.5 part by mass, and still more preferably not less than 1 part by mass, and is also preferably not more than 15 parts by mass, more preferably not more than 10 parts by mass, and still more preferably not more than 5 parts by mass, on the basis of 100 parts by mass of the resin constituting the resin particles.

<14> The process for producing a resin particle dispersion according to any one of the above aspects <1> to <13>, wherein the content of the organic solvent in the resin neutralized product is preferably not more than 5% by mass, more preferably not more than 1% by mass, still more preferably substantially 0% by mass, and even still more preferably 0% by mass.

<15> The process for producing a resin particle dispersion according to any one of the above aspects <1> to <14>, wherein a temperature upon mixing in the step (1) is not lower than a glass transition temperature of the polyester resin, and not higher than a boiling point of the aqueous medium used in the step (2), and is preferably not lower than 70° C., more preferably not lower than 80° C., and still more preferably not lower than 90° C., and is also preferably lower than 100° C., and more preferably not higher than 98° C.

<16> The process for producing a resin particle dispersion according to any one of the above aspects <1> to <15>, wherein the step (2) is a step of emulsifying the resin neutralized product by phase inversion emulsification.

<17> The process for producing a resin particle dispersion according to any one of the above aspects <1> to <16>, wherein a temperature upon adding the aqueous medium in the step (2) is not lower than a glass transition temperature of the polyester resin, and not higher than a boiling point of the aqueous medium used in the step (2), and is preferably not lower than 70° C., more preferably not lower than 80° C., and still more preferably not lower than 90° C., and is also preferably lower than 100° C., and more preferably not higher than 98° C.

<18> The process for producing a resin particle dispersion according to any one of the above aspects <1> to <17>, wherein a velocity of addition of the aqueous medium until terminating the phase inversion in the step (2) is preferably not less than 0.1 part by mass/min, more preferably not less than 1 part by mass/min, and still more preferably not less than 3 parts by mass/min, and is also preferably not more than 50 parts by mass/min, more preferably not more than 30 parts by mass/min, still more preferably not more than 15 parts by mass/min, and even still more preferably not more than 8 parts by mass/min, on the basis of 100 parts by mass of the resin constituting the resin particles.

<19> A process for producing a toner for development of electrostatic images, including the process for producing a resin particle dispersion according to any one of the above aspects <1> to <18>, and further including the following steps (3) and (4):

Step (3): aggregating the resin particles in the resin particle dispersion obtained in the step (2) to obtain aggregated particles; and Step (4): coalescing the aggregated particles obtained in the step (3) to obtain toner particles.

<20> The process for producing a toner for development of electrostatic images according to the above aspect <19>, wherein in the step (3), the resin particles are aggregated together with releasing agent particles.

<21> The process for producing a toner for development of electrostatic images according to the above aspect <19> or <20>, wherein in the step (3), there is used an aggregating agent, preferably an inorganic aggregating agent, more preferably an inorganic metal salt or an inorganic ammonium salt, still more preferably an inorganic ammonium salt, and even still more preferably ammonium sulfate.

<22> The process for producing a toner for development of electrostatic images according to the above aspect <21>, wherein an amount of the aggregating agent used is preferably not more than 50 parts by mass, more preferably not more than 40 parts by mass, and still more preferably not more than 30 parts by mass, and is also preferably not less than 1 part by mass, more preferably not less than 5 parts by mass, and still more preferably not less than 10 parts by mass, on the basis of 100 parts by mass of the resin constituting the resin particles.

EXAMPLES

Various properties of a polyester, resin particles, a toner, etc., were measured and evaluated by the following methods.

[Acid Value and Hydroxyl Value of Polyester]

Measured by the same method as prescribed in JIS K0070 except that chloroform was used as a solvent for the measurement.

[Concentration of Ester Group in Polyester]

The concentration of an ester group in a polyester is calculated according to the following formula.

Concentration of Ester Group (mmol/g)=$A/B$, wherein A is the number of moles (mmol) of an ester group in a polyester resin, and B is a mass (g) of the resin, which are respectively calculated according to the following formulae:

$A$ (mmol)=2×(Number of Moles (mmol) of Acid Monomer Charged or Number of Moles (mmol) of Alcohol Monomer Charged, whichever is smaller)×Reaction Rate; and $B$ (g)=[Total Mass (g) of Acid Monomer and Alcohol Monomer Charged]−[Mass (g) of Water Produced upon Synthesis of Resin].

Meanwhile, the reaction rate and the mass of water produced upon synthesis of the resin are respectively calculated according to the following formulae.

(1) Reaction Rate in the case where the alcohol monomer is present in an excessive amount relative to the acid monomer:

Reaction Rate=Acid Value (mgKOH/g) of Polyester/Acid Value (mgKOH/g) upon Charging Monomers, wherein the acid value upon charging monomers is determined from the following formula:

2×(Total Number of Moles (mmol) of Acid Monomer Charged×56.1/Total Mass (g) of Acid Monomer and Alcohol Monomer Charged.

(2) Reaction Rate in the case where the acid monomer is present in an excessive amount relative to the alcohol monomer:

Reaction Rate=Hydroxyl Value (mgKOH/g) of Polyester/Hydroxyl Value (mgKOH/g) upon Charging Monomers, wherein the hydroxyl value upon charging monomers is determined from the following formula:

2×(Total Number of Moles (mmol) of Alcohol Monomer Charged×56.1/Total Mass (g) of Acid Monomer and Alcohol Monomer Charged.

(3) Mass of Water Produced upon Synthesis of Resin:

Mass (g) of Water Produced upon Synthesis of Resin=2× 18 (Molecular Weight of Water)×$A$.

[Softening Point and Glass Transition Temperature of Polyester]

(1) Softening Point

Using a flow tester "CFT-500D" available from Shimadzu Corporation, 1 g of a sample was extruded through a nozzle having a die pore diameter of 1 mm and a length of 1 mm while heating the sample at a temperature rise rate of 6° C./min and applying a load of 1.96 MPa thereto by a plunger. The softening point was determined as the temperature at which a half amount of the sample was flowed out when plotting a downward movement of the plunger of the flow tester relative to the temperature.

(2) Glass Transition Temperature

Using a differential scanning calorimeter "Q100" available from TA Instruments Japan Inc., a sample was heated to 200° C. and then cooled from 200° C. to 0° C. at a temperature drop rate of 10° C./min, and thereafter heated again to 200° C. at a temperature rise rate of 10° C./min to measure an endotherm thereof. Among the endothermic peaks observed in the characteristic curve, the temperature of the peak having a largest peak area was defined as an endothermic maximum peak temperature. Also, in the case where the sample was a crystalline polyester, the peak temperature was defined as a melting point of the sample. In the case where the sample was a non-crystalline polyester, if any endothermic peak was observed in the characteristic curve, the endothermic peak temperature observed was defined as a glass transition temperature of the sample. Whereas, when a shift of the characteristic curve was observed without any peaks, the temperature at which a tangential line having a maximum inclination of the curve in the portion of the curve shift was intersected with an extension of the baseline on the high-temperature side of the curve shift was read as the glass transition temperature.

[Melting Point of Releasing Agent]

Using a differential scanning calorimeter "Q100" available from TA Instruments Japan Inc., a sample was heated to 200° C. and then cooled from 200° C. to 0° C. at a temperature drop rate of 10° C./min, and thereafter heated again at a temperature rise rate of 10° C./min to measure a heat of melting of the sample. The maximum peak temperature observed in a characteristic curve of the heat of melting was defined as a melting point of the sample.

[Volume Median Particle Size ($D_{50}$) and Particle Size Distribution of Aggregated Particles]

The volume median particle sizes of the aggregated particles was measured as follows.

Measuring Apparatus: "Coulter Multisizer III" commercially available from Beckman Coulter Inc.

Aperture Diameter: 50 μm

Analyzing Software: "Multisizer III Ver. 3.51" commercially available from Beckman Coulter Inc.

Electrolyte Solution: "Isotone II" commercially available from Beckman Coulter Inc.

Measuring Conditions:

The sample dispersion containing the aggregated particles was added to 100 mL of the electrolyte solution, and after controlling a concentration of the resultant dispersion such that the determination for particle sizes of 30000 particles was completed within 20 s, the particle sizes of 30000 particles were measured under such a concentration condition, and a volume median particle size ($D_{50}$) thereof was determined from the particle size distribution.

Also, the CV (%) as the particle size distribution was calculated according to the following formula:

CV (%)=(Standard Deviation of Particle Size Distribution/Volume-Average Particle Size ($D_{50}$))× 100.

[Volume Median Particle Size ($D_{50}$) and Particle Size Distribution of Toner (Particles)]

The volume median particle size of the toner (particles) was measured as follows.

The measuring apparatus, aperture diameter, analyzing software and electrolyte solution used in the measurement were the same as those used above for measuring the volume median particle size of the aggregated particles.

Dispersing Solution:

A polyoxyethylene lauryl ether "EMULGEN 109P" (HLB: 13.6) commercially available from Kao Corporation, was dissolved in the above electrolyte solution to prepare a dispersion having a concentration of 5% by mass.

Dispersing Conditions:

Ten milligrams of the toner as a sample to be measured was added to 5 mL of the above dispersing solution, and dispersed using an ultrasonic disperser for 1 min. Thereafter, 25 mL of the electrolyte solution was added to the resulting dispersion, and the obtained mixture was further dispersed using the ultrasonic disperser for 1 min to prepare a sample dispersion.

Measuring Conditions:

The thus prepared sample dispersion was added to 100 mL of the electrolyte solution, and after controlling a concentration of the resultant dispersion such that the determination for particle sizes of 30000 particles was completed within 20 s, the particle sizes of 30000 particles were measured under such a concentration condition, and a volume median particle size ($D_{50}$) thereof was determined from the particle size distribution.

Also, the CV (%) was calculated according to the following formula:

CV (%)=(Standard Deviation of Particle Size Distribution/Volume-Average Particle Size ($D_{50}$))×100.

[Volume Median Particle Size (Dm) and Particle Size Distribution of Resin Particles and Releasing Agent Particles]
(1) Measuring Apparatus: Laser diffraction particle size analyzer "LA-920" commercially available from HORIBA Ltd.
(2) Measuring Conditions: Using a cell for the measurement which was filled with distilled water, a volume median particle size (Dm) of the particles was measured at a concentration at which an absorbance thereof fell within an adequate range. Also, the CV was calculated according to the following formula:

CV (%)=(Standard Deviation of Particle Size Distribution/Volume-Average Particle Size)×100.

[Solid Content of Resin Particle Dispersion and Releasing Agent Particle Dispersion]

Using an infrared moisture meter "FD-230" available from Kett Electric Laboratory, 5 g of a sample to be measured was subjected to measurement for a water content (%) thereof at a drying temperature of 150° C. under a measuring mode 96 (monitoring time: 2.5 min/variation range: 0.05%). The solid content of the respective dispersions was calculated according to the following formula:

Solid Content (% by mass)=100−M, wherein M is a water content (%) which is represented by the formula: [(W−$W_0$)/W]×100 wherein W is a mass of the sample before the drying (initial mass of the sample); and $W_0$ is a mass of the sample after the drying (absolute dry mass).

[pH of Basic Aqueous Solution]

Using a pH meter "SevenGo pH meter SG2" available from Mettler-Toledo International Inc., the basic aqueous solution was sufficiently stirred to prepare a uniform solution and then allowed to stand at 25° C. for 3 min, and thereafter the pH of the resulting solution was measured.

[Degree of Neutralization of Resin Particle Dispersion]

The degree of neutralization of the resin particle dispersion was calculated according to the following formula.

Degree of Neutralization(%)=(Number of Moles of Basic Compound×Valence thereof)/(Number of Moles of Acid Group in Polyester Resin)

Meanwhile, the number of moles of an acid group in the polyester resin was calculated according to the following formula.

Number of Moles (mol) of Acid Group in Polyester Resin=Mass (g) of Resin×Acid Value (mgKOH/g) of Resin/56.1/1000

Production of Polyester Resins

Production Example 1

Production of Polyesters a, b, c and d

The raw materials of a polyester except for fumaric acid as shown in Table 1 were charged together with tin di(2-ethyl hexanoate) and gallic acid into a 10 L-capacity four-necked flask equipped with a nitrogen inlet tube, a dehydration tube with a fractionating column through which a 98° C. hot water was passed, a stirrer and a thermocouple. In a nitrogen atmosphere, the contents of the flask were heated to 180° C. and then from 180° C. to 210° C. at a temperature rise rate of 10° C./h, and thereafter subjected to polycondensation reaction at 210° C. for 7 h. Then, after adding fumaric acid and 4-tert-butyl catechol to the flask, the contents of the flask were reacted at 210° C. under normal pressures for 5 h, and then further reacted under a pressure of 8.3 kPa until the softening point of the reaction product reached the value as shown in Table 1, thereby obtaining non-crystalline polyesters a, b, c and d. Properties of the thus obtained non-crystalline polyesters a, b, c and d are shown in Table 1.

Production Example 2

Production of Polyester e

The raw materials of a polyester except for fumaric acid as shown in Table 1 were charged together with dibutyl tin oxide into a 10 L-capacity four-necked flask equipped with a nitrogen inlet tube, a dehydration tube, a stirrer and a thermocouple. In a nitrogen atmosphere, the contents of the flask were subjected to polycondensation reaction at 230° C. for 5 h, followed by cooling them to 210° C. Then, after adding fumaric acid and 4-tert-butyl catechol to the flask, the contents of the flask were reacted at 210° C. under normal pressures for 5 h, and then further reacted under a pressure of 8.3 kPa until the softening point of the reaction product reached 110° C., thereby obtaining a non-crystalline polyester e. Properties of the thus obtained non-crystalline polyester e are shown in Table 1.

Production Example 3

Production of Polyester f

The raw materials of a polyester as shown in Table 1 were charged together with dibutyl tin oxide into a 10 L-capacity four-necked flask equipped with a nitrogen inlet tube, a dehydration tube, a stirrer and a thermocouple. In a nitrogen atmosphere, the contents of the flask were subjected to polycondensation reaction at 220° C. until the softening point of the reaction product reached 121° C., thereby obtaining a non-crystalline polyester f. Properties of the thus obtained non-crystalline polyester f are shown in Table 1.

TABLE 1

| Raw material monomers | Polyester a Molar ratio (%) | Polyester a Amount charged (g) | Polyester b Molar ratio (%) | Polyester b Amount charged (g) | Polyester c Molar ratio (%) | Polyester c Amount charged (g) | Polyester d Molar ratio (%) | Polyester d Amount charged (g) | Polyester e Molar ratio (%) | Polyester e Amount charged (g) | Polyester f Molar ratio (%) | Polyester f Amount charged (g) |
|---|---|---|---|---|---|---|---|---|---|---|---|---|
| Alcohol component | | | | | | | | | | | | |
| 1,2-Propanediol | 100 | 3420 | 100 | 3640 | 70 | 1813 | 100 | 2786 | | | | |
| BPA-PO*1 | | | | | 30 | 3579 | | | 99 | 8237 | 50 | 4170 |
| BPA-EO*2 | | | | | | | | | 1 | 82 | 50 | 3881 |
| Acid component | | | | | | | | | | | | |
| Fumaric acid | 45 | 2349 | 70 | 5230 | 45 | 1779 | 20 | 850 | 61.62 | 1717 | | |
| Isophthalic acid | | | | | | | 40 | 2434 | | | | |
| Terephthalic acid | 50 | 2349 | | | 50 | 2829 | | | 41.6 | 1635 | 69 | 2253 |
| Succinic acid | | | 20 | 1130 | | | | | | | | |
| Dodecenyl succinic anhydride | | | | | | | 40 | 3930 | | | 6 | 322 |
| Trimellitic anhydride | | | | | | | | | | | 25 | 945 |
| Esterification catalyst | | | | | | | | | | | | |
| Dibutyl tin oxide | | | | | | | | | | 32 | | 15 |
| Tin di(2-ethyl hexanoate) | | 50 | | 50 | | 50 | | 50 | | | | |
| Esterification co-catalyst | | | | | | | | | | | | |
| Gallic acid | | 3 | | 3 | | 3 | | 3 | | | | |
| Polymerization inhibitor | | | | | | | | | | | | |
| 4-tert-Butyl catechol | | 5 | | 5 | | 5 | | 5 | | 8 | | |
| Properties | | | | | | | | | | | | |
| Concentration of ester group (mmol/g) | | 10.7 | | 10.1 | | 7.3 | | 6.9 | | 3.9 | | 4.1 |
| Acid value (mgKOH/g) | | 20.5 | | 19.0 | | 20.5 | | 17.6 | | 24.4 | | 21 |
| Hydroxyl value (mgKOH/g) | | 20.8 | | 17.7 | | 18.2 | | 18.6 | | 20.5 | | 19.3 |
| Softening point (° C.) | | 94.5 | | 106.0 | | 111.5 | | 70.5 | | 110 | | 121 |
| Glass transition temperature (° C.) | | 49.4 | | 56.5 | | 60.9 | | 24.2 | | 64 | | 65 |

Note
*1 Polyoxypropylene (2.2)-2,2-bis(4-hydroxyphenyl)propane
*2 Polyoxyethylene (2.2)-2,2-bis(4-hydroxyphenyn)propane Production of Basic Aqueous Solutions Production Example 4

Production of Basic Aqueous Solution 1

A 1 L beaker was charged with 50 g of potassium carbonate and 450 g of deionized water, and the contents of the beaker were stirred using a magnetic stirrer for 30 min, thereby preparing a 10% by mass potassium carbonate aqueous solution having a pH of 12.2 as measured at 25° C.

Production Example 5

Production of Basic Aqueous Solutions 2 to 7

A 1 L beaker was charged with 100 g of potassium hydroxide and 400 g of deionized water, and the contents of the beaker were stirred using a magnetic stirrer for 30 min, thereby preparing a 20% by mass potassium hydroxide aqueous solution. The thus prepared potassium hydroxide aqueous solution had a pH of 14.0. Next, while stirring the potassium hydroxide aqueous solution using a magnetic stirrer at 25° C., an electrode of a pH meter was dipped in the solution, and phosphoric acid and deionized water were added in predetermined amounts to the solution to measure a pH of the resulting solution. The above procedure was repeated until the pH of the solution reached 13.0 as measured at 25° C., thereby preparing a basic aqueous solution 2 containing 10% by mass of potassium hydroxide and having a pH of 13.0 as measured at 25° C. The same procedure was repeated to prepare basic aqueous solutions 3 to 7 having a pH of 12.0, a pH of 11.0, a pH of 10.0, a pH of 9.0 and a pH of 8.0, respectively, and each containing 10% by mass of potassium hydroxide.

Production Example 6

Production of Basic Aqueous Solution 8

A 1 L beaker was charged with 50 g of potassium hydroxide and 450 g of deionized water, and the contents of the beaker were stirred using a magnetic stirrer for 30 min, thereby preparing a basic aqueous solution 8 having a pH of 14.0 as measured at 25° C.

Production Example 7

Production of Basic Aqueous Solution 9

(Preparation of Salt-Containing Aqueous Solution (Buffer Solution of Sodium Pyrophosphate and Hydrochloric Acid))

Deionized water was added to 49.3 g of sodium pyrophosphate decahydrate while dissolving the salt therein to thereby prepare 357.1 g in total of a 7% by mass sodium pyrophosphate aqueous solution. The thus prepared sodium pyrophosphate aqueous solution was charged into a 1 L beaker, and a 1 M hydrogen chloride aqueous solution was added into the beaker while stirring the contents of the beaker using a magnetic stirrer until a pH of the resulting solution reached 8.3 as measured at 25° C. Successively, ion-exchanged water and a 1 M hydrogen chloride aqueous solution were added into the beaker to prepare a basic aqueous solution 9 containing 5% by mass of sodium pyrophosphate and having a pH of 8.2 as measured at 25° C.

Production Example 8

Production of Basic Aqueous Solution 10

A 0.5 L-capacity beaker was charged with 50 g of a 25% by mass aqueous ammonia and 250 g of deionized water, and the contents of the beaker were stirred using a magnetic stirrer for 1 min, thereby preparing a basic aqueous solution 10 containing 4.2% by mass of aqueous ammonia and having a pH of 12.2 as measured at 25° C.

Properties of the thus obtained basic aqueous solutions 1 to 10 are shown in Table 2.

Production of Resin Particle Dispersions

Example 1

Production of Resin Particle Dispersion A

A 2 L-capacity stainless steel vessel was charged with 600 g of the polyester a, 30 g of a copper phthalocyanine pigment "ECB-301" available from Dai-Nichi Seika Color & Chemicals Mfg. Co., Ltd., 40.0 g of an anionic surfactant "NEOPELEX G-15" (a 15% by mass aqueous solution of sodium dodecylbenzenesulfonate) available from Kao Corporation, 6.0 g of a nonionic surfactant "EMULGEN 430" (a polyoxyethylene (26 mol) oleyl ether; HLB: 16.2) available from Kao Corporation, 151.5 g of the basic aqueous solution 1 (corresponding to a degree of neutralization of 100 mol %), and 81.7 g of deionized water, followed by mixing the contents of the vessel with each other. While stirring with a paddle-shaped stirrer at a rate of 1.2 m/s, the resulting mixture was heated to 95° C. Further, while stirring with a paddle-shaped stirrer at a rate of 1.2 m/s, the mixture was allowed to stand at 95° C. for 2 h, thereby obtaining a resin neutralized product.

TABLE 2

| | Basic compound | pH controller | Concentration of basic compound (% by mass) | Concentration of basic compound (mmol/g) | pH (25° C.) |
|---|---|---|---|---|---|
| Basic aqueous solution 1 | Potassium carbonate | — | 10 | 0.72 | 12.2 |
| Basic aqueous solution 2 | Potassium hydroxide | Phosphoric acid | 10 | 1.78 | 13.0 |
| Basic aqueous solution 3 | Potassium hydroxide | Phosphoric acid | 10 | 1.78 | 12.0 |
| Basic aqueous solution 4 | Potassium hydroxide | Phosphoric acid | 10 | 1.78 | 11.0 |
| Basic aqueous solution 5 | Potassium hydroxide | Phosphoric acid | 10 | 1.78 | 10.0 |
| Basic aqueous solution 6 | Potassium hydroxide | Phosphoric acid | 10 | 1.78 | 9.0 |
| Basic aqueous solution 7 | Potassium hydroxide | Phosphoric acid | 10 | 1.78 | 8.0 |
| Basic aqueous solution 8 | Potassium hydroxide | — | 10 | 1.78 | 14.0 |
| Basic aqueous solution 9 | Sodium pyrophosphate | Hydrochloric acid | 5 | 0.19 | 8.2 |
| Basic aqueous solution 10 | Ammonia | — | 4.2 | 2.47 | 12.2 |

Production of Releasing Agent Dispersion

Production Example 9

Production of Releasing Agent Dispersion

In a 1 L-capacity beaker, 4.29 g of an aqueous solution of dipotassium alkenyl (mixture of hexadecenyl group and octadecenyl group) succinate "LATEMULASK" (concentration of effective ingredients: 28% by mass) available from Kao Corporation was dissolved in 480 g of deionized water, and then the resulting solution was mixed with 120 g of a carnauba wax "Carnauba Wax C1" (melting point: 85° C.) available from S. Kato & Co. While maintaining the resulting mixture at a temperature of 90 to 95° C., the mixture was subjected to dispersing treatment for 30 min using an ultrasonic disperser "Ultrasonic Homogenizer 600 W" available from Nihonseiki Kaisha Ltd., and then cooled to room temperature. Then, ion-exchanged water was added to the resulting dispersion to adjust a solid content of the dispersion to 20% by mass, thereby obtaining a releasing agent dispersion. The resulting releasing agent emulsified particles had a volume median particle size ($D_{50}$) of 0.419 nm and a coefficient of variation of particle size distribution (CV) of 31%.

Next, while stirring the obtained reaction mixture with a paddle-shaped stirrer at a rate of 1.2 m/s, 1146 g of deionized water was added dropwise thereto at 95° C. at a rate of 6 g/min, thereby obtaining an emulsion. Then, the resulting emulsion was cooled to 25° C. and passed through a wire mesh having a 200 mesh screen (opening size: 105 μm), and deionized water was added to the obtained dispersion to adjust a solid content of the dispersion to 30% by mass, thereby obtaining a resin particle dispersion A. Properties of the thus obtained resin particle dispersion A are shown in Table 3.

Examples 2 to 4

Production of Resin Particle Dispersions B to D

The same procedure as in Example 1 was repeated except that 151.5 g of the basic aqueous solution 1 used was replaced with 196.8 g of each of the basic aqueous solutions 3 to 5, and the amount of deionized water used was changed from 81.7 g to 40.9 g, thereby obtaining resin particle dispersions B to D. Properties of the thus obtained resin particle dispersions B to D are shown in Table 3.

Example 5

Production of Resin Particle Dispersion E

The same procedure as in Example 1 was repeated except that the polyester a used was replaced with the polyester b, the amount of the basic aqueous solution 1 was changed from 151.5 g to 140.4 g, and the amount of the deionized water was changed from 81.7 g to 91.6 g, thereby obtaining a resin particle dispersion E. Properties of the thus obtained resin particle dispersion E are shown in Table 3.

Example 6

Production of Resin Particle Dispersion F

The same procedure as in Example 1 was repeated except that the polyester a used was replaced with the polyester c, thereby obtaining a resin particle dispersion F. Properties of the thus obtained resin particle dispersion F are shown in Table 3.

Examples 7 and 8

Production of Resin Particle Dispersions G and H

The same procedure as in Example 1 was repeated except that the polyester a used was replaced with the polyester c, and 151.5 g of the basic aqueous solution 1 used was replaced with 184.5 g of each of the basic aqueous solutions 2 and 5, and the amount of deionized water used was changed from 81.7 g to 52.0 g, thereby obtaining resin particle dispersions G and H. Properties of the thus obtained resin particle dispersions G and H are shown in Table 3.

Example 9

Production of Resin Particle Dispersion I

The same procedure as in Example 1 was repeated except that the polyester a used was replaced with the polyester d, the amount of the basic aqueous solution 1 was changed from 151.5 g to 130.1 g, and the amount of the deionized water was changed from 81.7 g to 101.0 g, thereby obtaining a resin particle dispersion I. Properties of the thus obtained resin particle dispersion I are shown in Table 3.

Examples 10 and 11

Production of Resin Particle Dispersions J and K

The same procedure as in Example 1 was repeated except that the polyester a used was replaced with the polyester d, and 151.5 g of the basic aqueous solution 1 used was replaced with 158.4 g of each of the basic aqueous solutions 2 and 6, and the amount of deionized water used was changed from 81.7 g to 75.5 g, thereby obtaining resin particle dispersions J and K. Properties of the thus obtained resin particle dispersions J and K are shown in Table 3.

Example 12

Production of Resin Particle Dispersion L

The same procedure as in Example 1 was repeated except that 600 g of the polyester a used was replaced with 228 g of the polyester a and 372 g of the polyester e, the amount of the basic aqueous solution 1 was changed from 151.5 g to 169.4 g, and the amount of the deionized water was changed from 81.7 g to 75.5 g, thereby obtaining a resin particle dispersion L. Properties of the thus obtained resin particle dispersion L are shown in Table 3.

Example 13

Production of Resin Particle Dispersion M

The same procedure as in Example 1 was repeated except that 81.7 g of deionized water used was replaced with 81.7 g of methyl ethyl ketone, thereby obtaining a resin particle dispersion M. Properties of the thus obtained resin particle dispersion M are shown in Table 3. Meanwhile, the content of the organic solvent (methyl ethyl ketone) in the resin neutralized product was 9.0% by mass.

Example 14

Production of Resin Particle Dispersion N

The same procedure as in Example 1 was repeated except that 151.5 g of the basic aqueous solution 1 used was replaced with 44.2 g of the basic aqueous solution 10, and the amount of deionized water used was changed from 81.7 g to 189 g, thereby obtaining a resin particle dispersion N. Properties of the thus obtained resin particle dispersion N are shown in Table 3.

Comparative Example 1

The same procedure as in Example 1 was repeated except that 151.5 g of the basic aqueous solution 1 used was replaced with 123.0 g of the basic aqueous solution 8, and the amount of deionized water used was changed from 81.7 g to 107.3 g. However, it was not possible to obtain a resin particle dispersion.

Comparative Example 2

Production of Resin Particle Dispersion O

The same procedure as in Example 1 was repeated except that 151.5 g of the basic aqueous solution 1 used was replaced with 196.8 g of the basic aqueous solution 7, and the amount of deionized water used was changed from 81.7 g to 40.9 g, thereby obtaining a resin particle dispersion O. Properties of the thus obtained resin particle dispersion O are shown in Table 3.

Comparative Example 3

The same procedure as in Example 1 was repeated except that the polyester a used was replaced with the polyester c, 151.5 g of the basic aqueous solution 1 used was replaced with 123.0 g of the basic aqueous solution 8, and the amount of deionized water used was changed from 81.7 g to 107.3 g. However, it was not possible to obtain a resin particle dispersion.

Comparative Example 4

Production of Resin Particle Dispersion P

The same procedure as in Example 1 was repeated except that the polyester a used was replaced with the polyester c, 151.5 g of the basic aqueous solution 1 used was replaced with 184.5 g of the basic aqueous solution 7, and the amount of deionized water used was changed from 81.7 g to 52.0 g, thereby obtaining a resin particle dispersion P. Properties of the thus obtained resin particle dispersion P are shown in Table 3.

Comparative Example 5

Production of Resin Particle Dispersion Q

The same procedure as in Example 1 was repeated except that the polyester a used was replaced with the polyester d, 151.5 g of the basic aqueous solution 1 used was replaced with 105.6 g of the basic aqueous solution 8, and the amount of deionized water used was changed from 81.7 g to 123.0 g, thereby obtaining a resin particle dispersion Q. Properties of the thus obtained resin particle dispersion Q are shown in Table 3.

Comparative Example 6

Production of Resin Particle Dispersion R

The same procedure as in Example 1 was repeated except that the polyester a used was replaced with the polyester d, 151.5 g of the basic aqueous solution 1 used was replaced with 158.4 g of the basic aqueous solution 7, and the amount of deionized water used was changed from 81.7 g to 75.5 g, thereby obtaining a resin particle dispersion R. Properties of the thus obtained resin particle dispersion R are shown in Table 3.

Comparative Example 7

Production of Resin Particle Dispersion S

The same procedure as in Example 1 was repeated except that 600 g of the polyester a used was replaced with 180 g of the polyester a and 420 g of the polyester e, the amount of the basic aqueous solution 1 was changed from 151.5 g to 171.7 g, and the amount of the deionized water was changed from 81.7 g to 63.5 g, thereby obtaining a resin particle dispersion S. Properties of the thus obtained resin particle dispersion S are shown in Table 3.

Comparative Example 8

Production of Resin Particle Dispersion T

The same procedure as in Example 1 was repeated except that 600 g of the polyester a used was replaced with 390 g of the polyester e and 210 g of the polyester f, the amount of the basic aqueous solution 1 was changed from 151.5 g to 171.5 g, and the amount of the deionized water was changed from 81.7 g to 75.2 g, thereby obtaining a resin particle dispersion T. Properties of the thus obtained resin particle dispersion T are shown in Table 3.

Comparative Examples 9 and 11

Production of Resin Particle Dispersions U and W

The same procedure as in Example 1 was repeated except that 600 g of the polyester a used was replaced with 390 g of the polyester e and 210 g of the polyester f, and 151.5 g of the basic aqueous solution 1 was replaced with 111.4 g of each of the basic aqueous solutions 5 and 8, and the amount of deionized water used was changed from 81.7 g to 117.8 g, thereby obtaining resin particle dispersions U and W. Properties of the thus obtained resin particle dispersions U and W are shown in Table 3.

Comparative Example 10

Production of Resin Particle Dispersion V

The same procedure as in Example 1 was repeated except that 600 g of the polyester a used was replaced with 390 g of the polyester e and 210 g of the polyester f, and 151.5 g of the basic aqueous solution 1 was replaced with 265.2 g of the basic aqueous solution 9, and the amount of deionized water used was changed from 81.7 g to 14.1 g, thereby obtaining a resin particle dispersion V. Properties of the thus obtained resin particle dispersion V are shown in Table 3.

Comparative Example 12

Production of Resin Particle Dispersion X

One thousand and two hundred grams of the polyester a, 60 g of a copper phthalocyanine pigment "ECB-301" available from Dai-Nichi Seika Color & Chemicals Mfg. Co., Ltd., and 12.0 g of a nonionic surfactant "EMULGEN 430" (a polyoxyethylene (26 mol) oleyl ether; HLB: 16.2) available from Kao Corporation, were heated and mixed at 160° C., and delivered while being kept in a molten state and fed to "CAVITRON CD1010" available from EUROTEC Co., Ltd., at a rate of 100 g/min.

An aqueous solution prepared by mixing 80.0 g of an anionic surfactant "NEOPELEX G-15" (a 15% by mass aqueous solution of sodium dodecylbenzenesulfonate) available from Kao Corporation, 303 g of the basic aqueous solution 1 (corresponding to a degree of neutralization of 100 mol %) and 2,455 g of deionized water was delivered to CAVITRON at a rate of 220 g/min while heating the aqueous solution at 100° C. by a heat exchanger, simultaneously with delivery of the above molten polyester resin material. Under the above conditions, CAVITRON was operated at a rotor rotating speed of 60 Hz under a pressure of 7 Kg/cm$^2$, thereby obtaining an emulsion. Then, the resulting emulsion was cooled to 25° C. and passed through a wire mesh having a 200 mesh screen (opening size: 105 μm), and deionized water was added to the obtained dispersion to adjust a solid content of the dispersion to 30% by mass, thereby obtaining a resin particle dispersion X. Properties of the thus obtained resin particle dispersion X are shown in Table 3.

TABLE 3

| Resin particle dispersion | Polyester Kind | Concentration of ester group (mgKOH/g) | Basic aqueous solution Kind | Basic aqueous solution pH | Degree of neutralization (mol %) | Properties of resin particle dispersion Volume median particle size $D_{50}$ (nm) | CV (%) |
|---|---|---|---|---|---|---|---|
| Example 1 | A | a | 10.7 | 1 | 12.2 | 100 | 117 | 19.5 |
| Example 2 | B | a | 10.7 | 3 | 12.0 | 160 | 122 | 20.8 |
| Example 3 | C | a | 10.7 | 4 | 11.0 | 160 | 133 | 21.8 |
| Example 4 | D | a | 10.7 | 5 | 10.0 | 160 | 145 | 21.5 |
| Example 5 | E | b | 10.1 | 1 | 12.2 | 100 | 124 | 19.5 |
| Example 6 | F | c | 7.3 | 1 | 12.2 | 100 | 130 | 21.5 |
| Example 7 | G | c | 7.3 | 2 | 13.0 | 150 | 144 | 22.8 |
| Example 8 | H | c | 7.3 | 5 | 10.0 | 150 | 148 | 23.1 |
| Example 9 | I | d | 6.9 | 1 | 12.2 | 100 | 138 | 21.5 |
| Example 10 | J | d | 6.9 | 2 | 13.0 | 150 | 164 | 23.0 |
| Example 11 | K | d | 6.9 | 6 | 9.0 | 150 | 161 | 23.9 |
| Example 12 | L | a/e = 38/62*1 | 6.5 | 1 | 12.2 | 100 | 158 | 23.4 |
| Example 13 | M | a | 10.7 | 1 | 12.2 | 100 | 129 | 22.0 |
| Example 14 | N | a | 10.7 | 10 | 12.2 | 100 | 214 | 24.2 |
| Comparative Example 1 | — | a | 10.7 | 8 | 14.0 | 100 | not emulsified | — |
| Comparative Example 2 | O | a | 10.7 | 7 | 8.0 | 160 | 343 | 32.1 |
| Comparative Example 3 | — | c | 7.3 | 8 | 14.0 | 100 | not emulsifiable | — |
| Comparative Example 4 | P | c | 7.3 | 7 | 8.0 | 150 | 343 | 32.1 |
| Comparative Example 5 | Q | d | 6.9 | 8 | 14.0 | 100 | 451 | 33.2 |
| Comparative Example 6 | R | d | 6.9 | 7 | 8.0 | 150 | 352 | 25.1 |
| Comparative Example 7 | S | a/e = 30/70*1 | 6.0 | 1 | 12.2 | 100 | 194 | 29.8 |
| Comparative Example 8 | T | e/f = 65/35*1 | 4.0 | 1 | 12.2 | 100 | 243 | 28.0 |
| Comparative Example 9 | U | e/f = 65/35*1 | 4.0 | 5 | 10.0 | 80 | 270 | 23.0 |
| Comparative Example 10 | V | e/f = 65/35*1 | 4.0 | 9 | 8.2 | 80 | 172 | 27.2 |
| Comparative Example 11 | W | e/f = 65/35*1 | 4.0 | 8 | 14.0 | 80 | 141 | 27.5 |
| Comparative Example 12 | X | a | 10.7 | 1 | 12.2 | 100 | 286 | 26.4 |

Note
*1 Mass ratio

From the results shown in Table 3, it was confirmed that the resin particles contained in the resin particle dispersions obtained in Examples 1 to 14 had a small particle size and a sharp particle size distribution as compared to the resin particles contained in the resin particle dispersions obtained in Comparative Examples 2 and 4 to 12.

Production of Toners

Example 15

Preparation of Toner 1

A 3 L-capacity four-necked flask equipped with a dehydration tube, a stirrer and a thermocouple was charged with 250 g of the resin particle dispersion A, 42 g of deionized water and 35 g of the releasing agent particle dispersion, and the contents of the flask were mixed with each other at 25° C. Then, while stirring the resulting mixture, an aqueous solution previously prepared by dissolving 21 g of ammonium sulfate in 216 g of deionized water was added dropwise to the mixture at 25° C. over 5 min. Then, the resulting dispersion was heated to 60° C. and maintained at 60° C. until a volume median particle size ($D_{50}$) of the resulting aggregated particles reached 5.2 μm, thereby obtaining a dispersion containing the aggregated particles.

An aqueous solution previously prepared by mixing 15 g of an anionic surfactant "EMAL E-27C" (concentration of active ingredients: 27% by mass) available from Kao Corporation and 1,183 g of deionized water was added to the resulting dispersion containing the aggregated particles at 60° C. The resulting mixture was heated to 80° C. and maintained at 80° C. for 10 min to coalesce the particles. The dispersion containing the obtained coalesced particles was cooled to 30° C., and subjected to suction filtration to separate solid components therefrom. The thus separated solid components were rinsed with deionized water and then dried at 33° C., thereby obtaining toner particles.

One hundred parts by mass of the thus obtained toner particles were charged together with 2.5 parts by mass of a hydrophobic silica "RY50" (average particle size: 0.04 μm) available from Nippon Aerosil Co., Ltd., and 1.0 part by mass of a hydrophobic silica "CAB-O-SIL TS720" (average particle size: 0.012 μm) available from Cabot Norit Japan Co. Ltd. into a Henschel mixer, followed by mixing the respective materials in the mixer. The resulting mixture was then allowed to pass through a 150 mesh sieve, thereby obtaining a toner 1. Properties of the thus obtained toner are shown in Table 4.

Examples 16 to 27 and Comparative Examples 13 to 21

Preparation of Toners 2 to 22

The same procedure as in Example 15 was repeated except for using the respective resin particle dispersions as shown in Table 4, thereby obtaining toners. Properties of the thus obtained toners are shown in Table 4.

Experimental Example 1

Dot Reproducibility of Printed Images

Using a commercially available printer "MicroLine 5400" available from Oki Data Corporation, a half tone image (2 dots, 2 space) with a resolution of 1200 dpi was printed on a wood-free paper "J Paper; A4 size" available from Fuji Xerox Co., Ltd. The thus printed image was observed by naked eyes and evaluated according to the following five ratings. As the numerical value assigned to each rating increases, the toner cloud around dots and white spots in the dots are reduced, and the dots become clearer. The results are shown in Table 4.

5: Substantially no toner cloud around dots was recognized and the dots were very clear, and there were no white spots in the dots.

4: Although slight toner cloud around dots was recognized, the dots were still clear, and there were no white spots in the dots.

3: Toner cloud around dots was recognized and the dots were slightly unclear, but there were no white spots in the dots.

2: Toner cloud around dots was recognized and the dots were slightly unclear, and there were white spots in the dots.

1: Toner cloud around dots was noticeable and the dots were unclear, and there were remarkable white spots in the dots.

Experimental Example 2

Charge Distribution of Toner

A polypropylene bottle "PP Bottle Wide Mouth 50 mL" available from Sanplatec Corporation, was charged with 0.6 g of a toner and 19.4 g of a ferrite carrier. The contents of the bottle were stirred using a ball mill for 20 min, and then measured for charge distribution thereof using a charge meter "q-test" available from Epping GmbH.

Measuring Conditions:

Toner Flow (mL/min): 160

Electrode Voltage (V): 4000

Deposition Time (s): 2

A graph of the charge distribution of the toner was prepared by connecting respective points of the measurement results with a line in a region where q/d fell within the range of from −0.4 to 0.4 (fC/10 μm).

The charge stability of the toner was evaluated by a half band width of a maximum peak of the charge distribution (a width of a section of the charge distribution curve which is formed by cutting the distribution curve along a half value of a height of the maximum peak present therein). The smaller the value of the half band width, the sharper the charge distribution and the more excellent the charge stability become.

TABLE 4

| | Toner | Resin particle dispersion | Polyester Kind | Polyester Concentration of ester group (mgKOH/g) | Basic aqueous solution Kind | Basic aqueous solution pH | Properties of toner Volume median particle size $D_{50}$ (nm) | Properties of toner CV (%) | Evaluation of toner Dot reproducibility | Evaluation of toner Charge distribution (fC/10 μm) |
|---|---|---|---|---|---|---|---|---|---|---|
| Example 15 | 1 | A | a | 10.7 | 1 | 12.2 | 5.1 | 18.5 | 5 | 0.55 |
| Example 16 | 2 | B | a | 10.7 | 3 | 12.0 | 5.0 | 19.5 | 5 | 0.69 |
| Example 17 | 3 | C | a | 10.7 | 4 | 11.0 | 5.2 | 18.9 | 4 | 0.59 |
| Example 18 | 4 | D | a | 10.7 | 5 | 10.0 | 5.0 | 19.9 | 4 | 0.70 |
| Example 19 | 5 | E | b | 10.1 | 1 | 12.2 | 5.1 | 17.8 | 5 | 0.58 |
| Example 20 | 6 | F | c | 7.3 | 1 | 12.2 | 5.1 | 20.1 | 5 | 0.64 |
| Example 21 | 7 | G | c | 7.3 | 2 | 13.0 | 5.2 | 21.1 | 4 | 0.79 |
| Example 22 | 8 | H | c | 7.3 | 5 | 10.0 | 4.9 | 21.8 | 4 | 0.81 |
| Example 23 | 9 | I | d | 6.9 | 1 | 12.2 | 5.1 | 18.8 | 5 | 0.57 |
| Example 24 | 10 | J | d | 6.9 | 2 | 13.0 | 5.0 | 19.9 | 4 | 0.69 |
| Example 25 | 11 | K | d | 6.9 | 6 | 9.0 | 5.0 | 21.0 | 4 | 0.75 |
| Example 26 | 12 | L | a/e = 38/62*[1] | 6.5 | 1 | 12.2 | 5.0 | 20.9 | 4 | 0.77 |
| Example 27 | 13 | N | a | 10.7 | 10 | 12.2 | 5.0 | 21.2 | 4 | 0.72 |
| Comparative Example 13 | 14 | O | a | 10.7 | 7 | 8.0 | 5.1 | 28.4 | 2 | 1.50 |
| Comparative Example 14 | 15 | P | c | 7.3 | 7 | 8.0 | 5.2 | 26.5 | 2 | 1.21 |
| Comparative Example 15 | 16 | Q | d | 6.9 | 8 | 14.0 | 5.0 | 30.1 | 1 | 1.55 |
| Comparative Example 16 | 17 | R | d | 6.9 | 7 | 8.0 | 5.2 | 22.9 | 3 | 0.99 |

TABLE 4-continued

|  |  | Resin particle dispersion | Polyester | | Basic aqueous solution | | Properties of toner | | Evaluation of toner | |
|---|---|---|---|---|---|---|---|---|---|---|
|  |  |  | Kind | Concentration of ester group (mgKOH/g) | Kind | pH | Volume median particle size $D_{50}$ (nm) | CV (%) | Dot reproducibility | Charge distribution (fC/10 μm) |
|  | Toner |  |  |  |  |  |  |  |  |  |
| Comparative Example 17 | 18 | S | a/e = 30/70*[1] | 6.0 | 1 | 12.2 | 5.0 | 23.2 | 3 | 1.08 |
| Comparative Example 18 | 19 | U | e/f = 65/35*[1] | 4.0 | 5 | 10.0 | 5.2 | 22.4 | 3 | 1.01 |
| Comparative Example 19 | 20 | V | e/f = 65/35*[1] | 4.0 | 9 | 8.2 | 5.0 | 23.3 | 2 | 1.31 |
| Comparative Example 20 | 21 | W | e/f = 65/35*[1] | 4.0 | 8 | 14.0 | 5.0 | 23.8 | 3 | 0.95 |
| Comparative Example 21 | 22 | X | a | 10.7 | 1 | 12.2 | 5.1 | 23.4 | 2 | 1.10 |

Note
*[1] Mass ratio

From the results shown in Table 4, it was confirmed that the toners for development of electrostatic images obtained in the Examples had a sharp and uniform particle size distribution and all were excellent in dot reproducibility and exhibited a sharp charge distribution, as compared to the toners for development of electrostatic images obtained in the Comparative Examples.

INDUSTRIAL APPLICABILITY

The resin particle dispersion obtained by the production process of the present invention contains resin particles having a small particle size and a narrow particle size distribution. As a result, the toner obtained by aggregating and coalescing the resin particles can also exhibit a narrow particle size distribution and is excellent in charge stability and dot reproducibility, and therefore can be suitably used as a toner in an electrostatic image development method.

What is claimed is:

1. A process for producing a resin particle dispersion, comprising:
   mixing a polyester resin and a basic aqueous solution to obtain a resin neutralized product; and
   adding an aqueous medium to the resin neutralized product obtained in said mixing to emulsify the resin neutralized product, wherein
   a concentration of an ester group in the polyester resin is not less than 6.3 mmol/g and not more than 12 mmol/g,
   a pH of the basic aqueous solution as measured at 25° C. is not less than 8.5 and not more than 13.5, and
   a content of an organic solvent in the resin neutralized product is not more than 10% by mass.

2. The process for producing a resin particle dispersion according to claim 1, wherein a temperature upon adding the aqueous medium in said adding is not lower than a glass transition temperature of the polyester resin and not higher than a boiling point of the aqueous medium used in said adding.

3. The process for producing a resin particle dispersion according to claim 1, wherein a velocity of addition of the aqueous medium until terminating phase inversion in said adding is not less than 0.1 part by mass/min and not more than 50 parts by mass/min, on the basis of 100 parts by mass of the resin constituting the resin particles.

4. The process for producing a resin particle dispersion according to claim 1, wherein the polyester resin is produced by polycondensing an alcohol component comprising an aliphatic diol having not less than 2 and not more than 4 main chain carbon atoms and a carboxylic acid component comprising fumaric acid.

5. The process for producing a resin particle dispersion according to claim 1, wherein a basic compound present in the basic aqueous solution is an inorganic base compound.

6. The process for producing a resin particle dispersion according to claim 1, wherein the basic compound present in the basic aqueous solution is sodium carbonate or potassium carbonate.

7. The process for producing a resin particle dispersion according to claim 1, wherein the basic aqueous solution is a buffer solution obtained by mixing a strong base and a weak acid.

8. The process for producing a resin particle dispersion according to claim 1, wherein a temperature during said mixing is not lower than the glass transition temperature of the polyester resin and not higher than the boiling point of the aqueous medium present during said adding.

9. A process for producing a toner for development of electrostatic images, comprising:
   mixing a polyester resin and a basic aqueous solution to obtain a resin neutralized product;
   adding an aqueous medium to the resin neutralized product obtained in said mixing to emulsify the resin neutralized product, thereby obtaining a resin particle dispersion;
   aggregating the resin particles in the resin particle dispersion obtained in said adding to obtain aggregated particles; and
   coalescing the aggregated particles obtained in said aggregating to obtain toner particles, wherein
   a concentration of an ester group in the polyester resin is not less than 6.3 mmol/g and not more than 12 mmol/g,
   a pH of the basic aqueous solution as measured at 25° C. is not less than 8.5 and not more than 13.5, and
   a content of an organic solvent in the resin neutralized product is not more than 10% by mass.

10. The process for producing a toner for development of electrostatic images according to claim 9, wherein a temperature upon adding the aqueous medium in said adding is not lower than a glass transition temperature of the polyester resin and not higher than a boiling point of the aqueous medium present during said adding.

11. The process for producing a toner for development of electrostatic images according to claim 9, wherein a velocity of addition of the aqueous medium until terminating phase inversion in said adding is not less than 0.1 part by mass/min and not more than 50 parts by mass/min, on the basis of 100 parts by mass of the resin constituting the resin particles.

12. The process for producing a toner for development of electrostatic images according to claim 9, wherein a basic compound present in the basic aqueous solution is an inorganic base compound.

13. The process for producing a toner for development of electrostatic images according to claim 9, wherein the polyester resin is produced by polycondensing an alcohol component comprising an aliphatic diol having not less than 2 and not more than 4 main chain carbon atoms and a carboxylic acid component comprising fumaric acid.

14. The process for producing a resin particle dispersion according to claim 1, wherein a temperature upon adding the aqueous medium during said adding is not lower than 70° C. and lower than 100° C.

15. The process for producing a resin particle dispersion according to claim 1, wherein a temperature upon mixing during said mixing is not lower than 70° C. and lower than 100° C.

16. The process for producing a resin particle dispersion according to claim 1, wherein a surfactant is adding during said mixing.

17. The process for producing a toner for development of electrostatic images according to claim 9, wherein an inorganic aggregating agent is present during said aggregating.

18. A process for producing a toner for development of electrostatic images, comprising:

mixing a polyester resin and a basic aqueous solution to obtain a resin neutralized product;

adding an aqueous medium to the resin neutralized product obtained in said mixing to emulsify the resin neutralized product, thereby obtaining a resin particle dispersion;

aggregating the resin particles in the resin particle dispersion obtained in said adding to obtain aggregated particles; and coalescing the aggregated particles obtained in said aggregating to obtain toner particles, wherein a concentration of an ester group in the polyester resin is not less than 10.0 mmol/g and not more than 11.0 mmol/g, a pH of the basic aqueous solution as measured at 25° C. is not less than 12.0 and not more than 12.5, and a content of an organic solvent in the resin neutralized product is not more than 10% by mass, a temperature upon adding the aqueous medium in said adding is not lower than a glass transition temperature of the polyester resin and not higher than a boiling point of the aqueous medium present during said adding, and a velocity of addition of the aqueous medium until terminating phase inversion in said adding is not less than 0.1 part by mass/min and not more than 50 parts by mass/min, on the basis of 100 parts by mass of the resin constituting the resin particles.

* * * * *